(12) United States Patent
Huang et al.

(10) Patent No.: US 6,308,282 B1
(45) Date of Patent: Oct. 23, 2001

(54) APPARATUS AND METHODS FOR PROVIDING FAULT TOLERANCE OF NETWORKS AND NETWORK INTERFACE CARDS

(75) Inventors: Jiandong Huang, Plymouth, MN (US); Ling Li, Ames, IA (US); Sejun Song, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/188,976

(22) Filed: Nov. 10, 1998

(51) Int. Cl.$^7$ .................................................. G06F 11/07
(52) U.S. Cl. ............................. 714/4; 714/56; 710/131; 370/216
(58) Field of Search .................................. 714/4, 43, 48, 714/56; 709/217–221; 710/100, 126, 127, 131; 340/825.01; 379/221; 370/216–221, 395, 235, 489

(56) References Cited

U.S. PATENT DOCUMENTS

| | | | |
|---|---|---|---|
| 5,130,974 | * | 7/1992 | Kawamura et al. . |
| 5,508,997 | | 4/1996 | Katou . |
| 5,784,547 | | 7/1998 | Dittmar et al. . |
| 6,111,888 | * | 8/2000 | Green et al. . |
| 6,128,283 | * | 10/2000 | Sabaa et al. . |
| 6,167,025 | * | 12/2000 | Hsing et al. . |

FOREIGN PATENT DOCUMENTS 0854610A  7/1998  (EP) .
9818247A  4/1998  (WO) .

OTHER PUBLICATIONS

Huang J; Song S; Li L; Kappler P; Freimark R; Gustin J; Kozlik T: "An open solution to fault–tolerant Ethernet: design, prototyping, and evaluation" IEEE International performance, Computing and Communications Conference IPCCC'99, 12–Feb. 12, 1999; pp. 461–468. XP002130386, Scottsdale, AZ, USA.

* cited by examiner

*Primary Examiner*—Gopal C. Ray
(74) *Attorney, Agent, or Firm*—John G. Shudy, Jr.

(57) ABSTRACT

Methods and apparatus for implementation of fault-tolerant networks provide a network fault-tolerance manager for detecting failures and manipulating a node to communicate with an active channel. Failure detection incorporates one or more methods, including message pair and link pulse detection. Failure recovery includes switching all node data communications to a stand-by channel or switching just those nodes detecting a failure. Communication between nodes provides the distributed detection, with detecting nodes reporting failures to their network fault-tolerance manager and the network fault-tolerance manager broadcasting the failure recovery to all nodes. The network fault-tolerance manager is middleware, residing with each node in a logical hierarchy above a physical layer of a network and below a transport layer of the network. The approach is particularly suited to Ethernet LANs and capable of using commercial off-the-shelf network components.

18 Claims, 24 Drawing Sheets

APPARATUS AND METHODS FOR PROVIDING FAULT TOLERANCE OF NETWORKS AND NETWORK INTERFACE CARDS

TECHNICAL FIELD OF THE INVENTION

The present invention relates generally to network data communications. In particular, the present invention relates to apparatus and methods providing fault tolerance of networks and network interface cards, wherein middleware facilitates failure detection, and switching from an active channel to a stand-by channel upon detection of a failure on the active channel.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. The following notice applies to the software and data as described below and in the drawings hereto: Copyright © 1998, Honeywell, Inc., All Rights Reserved.

BACKGROUND OF THE INVENTION

Computer networks have become widely popular throughout business and industry. They may be used to link multiple computers within one location or across multiple sites.

The network provides a communication channel for the transmission of data, or traffic, from one computer to another. Network uses are boundless and may include simple data or file transfers, remote audio or video, multimedia conferencing, industrial process control and more.

Perhaps the most popular network protocol is Ethernet, a local area network (LAN) specification for high-speed terminal to computer communications or computer to computer file transfers. The Ethernet communication protocol permits and accommodates data transfers across a bus, typically a twisted pair or coaxial cable. Other media for data bus exist, such as fiber optic bus or wireless bus as just two examples. For convenience, the generic term bus will be used, regardless of media type.

A typical LAN will have a number of nodes connected to and in communication with the LAN. Each node will have a network interface card (NIC) providing the communication link to the physical LAN through a drop to the LAN. Alternatively, several nodes may be connected to a network hub, or switch, through their respective network interface cards. In addition, multiple LANs may be bridged together to create larger networks.

Nodes generally comply with the OSI model, i.e., the network model of the International Standards Organization. The OSI model divides network communications into seven functional layers. The layers are arranged in a logical hierarchy, with each layer providing communications to the layers immediately above and below. Each OSI layer is responsible for a different network service. The layers are 1) Physical, 2) Data Link, 3) Network, 4) Transport, 5) Session, 6) Presentation and 7) Application. The first three layers provide data transmission and routing. The Transport and Session layers provide the interface between user applications and the hardware. The last three layers manage the user application. Other network models are well known in the art.

While the Ethernet protocol provides recovery for message collision across the network, it is incapable, by itself, of recovering from failure of network components, such as the network interface cards, drops, hubs, switches, bridges or bus. Fault tolerance is thus often needed to assure continued node-to-node communications. One approach proposed by others is to design redundant systems relying on specialized hardware for failure detection and recovery. However, such solutions are proprietary and vendor-dependent, making them difficult and expensive to implement. These hardware-oriented systems may be justified in highly critical applications, but they may not be highly portable or expandable due to their specialized nature.

Accordingly, there exists a need for cost-effective apparatus and methods to provide fault tolerance that can be implemented on existing Ethernet networks using commercial-off-the-shelf (COTS) Ethernet hardware (network interface cards) and software (drivers and protocol). Such an open solution provides the benefits of low product cost, ease of use and maintenance, compliance with network standards and interoperability between networks.

SUMMARY OF THE INVENTION

A middleware approach provides network fault tolerance over conventional Ethernet networks. The networks have a plurality of nodes desiring to transmit packets of data. Nodes of the fault-tolerant network have more than one network connection, and include nodes having multiple connections to one network and nodes having single connections to multiple networks. A network fault-tolerance manager oversees detection of failures and manipulation of failure recovery. Failure recovery includes redirecting data transmission of a node from a channel indicating a failure to a stand-by channel. In one embodiment, failure recovery restricts data transmission, and thus receipt, to one active channel. In another embodiment, failure recovery allows receipt of valid data packets from any connected channel. In a further embodiment, the active channel and the stand-by channel share common resources.

The middleware comprises computer software residing above a network interface device and the device driver, yet below the system transport services and/or user applications. The invention provides network fault tolerance which does not require modification to existing COTS hardware and software that implement Ethernet. The middleware approach is transparent to applications using standard network and transport protocols, such as TCP/IP, UDP/IP and IP Multicast.

In one embodiment, a network node is simultaneously connected to more than one network of a multiple-network system. The node is provided with a software switch capable of selecting a channel on one of the networks. A network fault-tolerance manager performs detection of a failure on an active channel. The network fault-tolerance manager further provides failure recovery in manipulating the switch to select a stand-by channel. In a further embodiment, the node is connected to one active channel and one stand-by channel.

In a further embodiment, a network fault-tolerance manager performs detection and reporting of a failure on a stand-by channel, in addition to detection and recovery of a failure on an active channel.

In another embodiment, a node is simultaneously connected to more than one network of a multiple-network system. The node is provided with an NIC (network interface card) for each connected network. The node is further provided with an NIC switch capable of selecting one of the network interface cards. A network fault-tolerance manager provides distributed detection of a failure on an active channel. The network fault-tolerance manager further provides failure recovery in manipulating the NIC switch to select the network interface card connected to a stand-by channel. In a further embodiment, the node is connected to one active channel and one stand-by channel.

In a further embodiment, at least two nodes are each simultaneously connected to more than one network of a multiple-network system. Each node is provided with a network interface card for each connected network. Each node is further provided with an NIC switch capable of selecting one of the network interface cards. A network fault-tolerance manager provides distributed detection of a failure on an active channel. The network fault-tolerance manager further provides failure recovery in manipulating the NIC switch of each sending node to select the network interface card connected to a stand-by channel. Data packets from a sending node are passed to the stand-by channel. Valid data packets from the stand-by channel are passed up to higher layers by a receiving node. In this embodiment, all nodes using the active channel are swapped to one stand-by channel upon detection of a failure on the active channel. In a further embodiment, each node is connected to one active channel and one stand-by channel.

In a still further embodiment, at least two nodes are each simultaneously connected to more than one network of a multiple-network system. Each node is provided with a network interface card for each connected network. Each node is further provided with an NIC switch capable of selecting one of the network interface cards. A network fault-tolerance manager provides distributed detection of a failure on an active channel. The network fault-tolerance manager further provides failure recovery in manipulating the NIC switch of a sending node to select the network interface card connected to a stand-by channel. It is the node that reports a failure to the network fault-tolerance manager that swaps its data traffic from the active channel to a stand-by channel. Data packets from the sending node are passed to the stand-by channel. Sending nodes that do not detect a failure on the active channel are allowed to continue data transmission on the active channel. The NIC switch of each receiving node allows receipt of data packets on each network interface card across its respective channel. Valid data packets from any connected channel are passed up to higher layers. In a further embodiment, the node is connected to one active channel and one stand-by channel.

In a further embodiment, a node has multiple connections to a single fault-tolerant network. The node is provided with a software switch capable of selecting one of the connections to the network. A network fault-tolerance manager provides distributed failure detection of a failure on an active channel. The network fault-tolerance manager further provides failure recovery in manipulating the switch to select a stand-by channel.

In a further embodiment, the node is connected to one active channel and one stand-by channel.

In another embodiment, a node has multiple connections to a single fault-tolerant network. The node is provided with an NIC (network interface card) for each network connection. The node is further provided with an NIC switch capable of selecting one of the network interface cards. A network fault-tolerance manager provides distributed detection of a failure on an active channel. The network fault-tolerance manager further provides failure recovery in manipulating the NIC switch to select the network interface card connected to a stand-by channel. In a further embodiment, the node is connected to one active channel and one stand-by channel.

In a further embodiment, at least two nodes each have multiple connections to a single fault-tolerant network. Each node is provided with a network interface card for each network connection. Each node is further provided with an NIC switch capable of selecting one of the network interface cards. A network fault-tolerance manager provides distributed detection of a failure on an active channel. The network fault-tolerance manager further provides failure recovery in manipulating the NIC switch of each sending node to select the network interface card connected to a stand-by channel. Data packets from a sending node are passed to the stand-by channel. Valid data packets from the stand-by channel are passed up to higher layers by a receiving node. In this embodiment, all nodes using the active channel are swapped to one stand-by channel upon detection of a failure on the active channel. In a further embodiment, each node is connected to one active channel and one stand-by channel.

In a still further embodiment, at least two nodes each have multiple connections to a single fault-tolerant network. Each node is provided with a network interface card for each network connection. Each node is further provided with an NIC switch capable of selecting one of the network interface cards. A network fault-tolerance manager provides distributed detection of a failure on an active channel. The network fault-tolerance manager further provides failure recovery in manipulating the NIC switch of a sending node to select the network interface card connected to a stand-by channel. It is the node that reports a failure to the network fault-tolerance manager that swaps its data traffic from the failed active channel to a stand-by channel. Data packets from the sending node are passed to the stand-by channel. Sending nodes that do not detect a failure on the active channel are allowed to continue data transmission on the active channel. The NIC switch of each receiving node allows receipt of data packets on each network interface card across its respective channel. Valid data packets from any connected channel are passed up to higher layers. In a further embodiment, the node is connected to one active channel and one stand-by channel.

In another embodiment, the single fault-tolerant network has an open ring structure and a single fault-tolerant network manager node. The single fault-tolerant network manager node is connected to both ends of the open ring using two network interface cards. The network interface cards serve in the failure detection protocol only to detect network failures, e.g., a network bus failure. In the event a network failure is detected on the single fault-tolerant network, the two network interface cards close the ring to serve application data traffic.

In one embodiment, a fault-tolerant network address resolution protocol (FTNARP) automatically populates a media access control (MAC) address mapping table upon start-up of a node. The FTNARP obtains the MAC address of an active and stand-by network interface card. The FTNARP then broadcasts the information to other nodes on the active and stand-by channels. Receiving nodes add the information to their respective MAC address mapping tables and reply to the source node with that node's MAC address information. The source node receives the reply information and adds this information to its own MAC address mapping table.

In another embodiment, Internet protocol (IP) switching is provided for networks containing routers. The IP switching function is implemented within the NIC switch, wherein the NIC switch has an IP address mapping table. The IP address mapping table facilitates switching the IP destination address in each frame on the sender node, and switching back the IP address at the receiver node.

In a further embodiment, each node sends a periodic message across every connected channel. Receiving nodes compare the delta time in receiving the last message from the source node on the last channel after receiving the first message from the source node on a first channel. A failure is declared if the receiving node cannot receive the last message within an allotted time period, and the maximum number of allowed message losses is exceeded. In a still further embodiment, failure is determined using link integrity pulse sensing. Link integrity pulse is a periodic pulse used to verify channel integrity. In yet a further embodiment, both failure detection modes are utilized.

In another embodiment of the invention, instructions for causing a processor to carry out the methods described herein are stored on a machine-readable medium. In a further embodiment of the invention, the machine-readable medium is contained in the node and in communication with the node. In yet another embodiment of the invention, the machine-readable medium is in communication with the node, but not physically associated with the node.

One advantage of the invention is that it remains compliant with the IEEE (Institute of Electrical and Electronics Engineers, Inc.) 802.3 standard. Such compliance allows the invention to be practiced on a multitude of standard Ethernet networks without requiring modification of Ethernet hardware and software, thus remaining an open system.

As a software approach, the invention also enables use of any COTS cards and drivers for Ethernet and other networks. Use of specific vendor cards and drivers is transparent to applications, thus making the invention capable of vendor interoperability, system configuration flexibility and low cost to network users.

Furthermore, the invention provides the network fault tolerance for applications using OSI network and transport protocols layered above the middleware. One example is the use of TCP/IP-based applications, wherein the middleware supports these applications transparently as if the applications used the TCP/IP protocol over any standard, i.e., non-fault-tolerant, network.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense, and the scope of the invention is defined by the appended claims. Like numbers in the figures refer to like components, which should be apparent from the context of use.

The following detailed description is drafted in the context of an Ethernet LAN it will be apparent to those skilled in the art that the approach is adaptable to other network protocols and other network configurations.

The term channel is defined as the path from the network interface card of the sending node at one end to the network interface card of the receiving node at the other, and includes the drops, hubs, switches, bridges and bus. Two or more channels may share common resources, such a utilizing common hubs, switches, bridges and bus. Alternatively, channel resources may be mutually exclusive. Two channels available on a node are referred to as dual channel, although a node is not limited to having only two channels.

The detailed description generally begins with a discussion of network devices and their architecture, followed by a discussion of failure detection modes. Address management is discussed as a preface to failure recovery. Failure recovery is drafted in the context of what is referred to herein as a channel swap mode and a device swap mode. Finally, various exemplary implementations of the concepts are disclosed.

Devices and Architecture

Figure 1A:
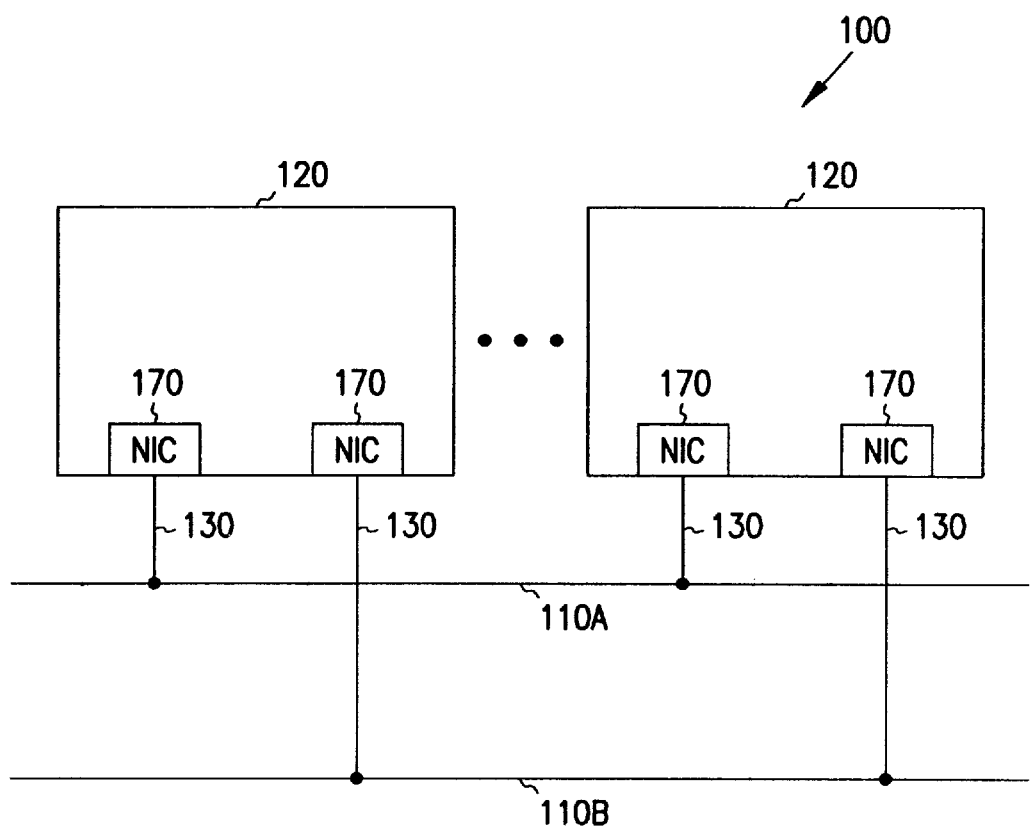
FIG. 1A is a block diagram of a portion of an multiple-network Ethernet having multiple nodes incorporating one embodiment of the invention.

FIG. 1A shows a conceptualized drawing of a simplified fault-tolerant network incorporating the invention. Fault-tolerant network 100 is an example of a multiple-network system. Fault-tolerant network 100 comprises an Ethernet bus 110A and bus 110B. The fault-tolerant network 100 further contains two or more nodes 120 which are connected to Ethernet buses 110A and 110B via drops 130. The nodes 120 contain one or more network interface cards 170 for controlling connection to drops 130. While network interface cards 170 are depicted as single entities, two or more network interface cards 170 may be combined as one physical card having multiple communication ports.

Figure 1B:
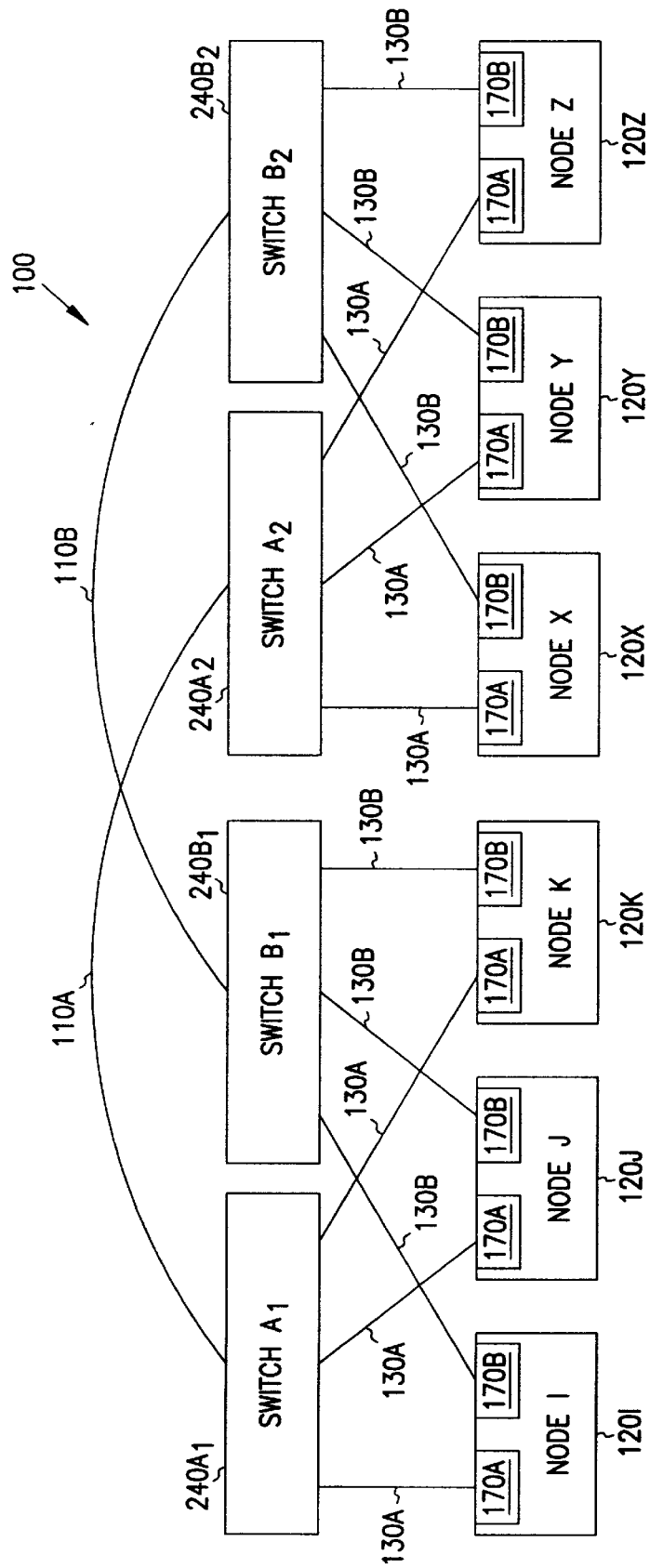
FIG. 1B is a block diagram of one embodiment of a multiple-network system incorporating the invention.

FIG. 1B shows a more complete fault-tolerant network 100 of one embodiment of a multiple-network system. Fault-tolerant network 100 contains a primary network bus 110A and a secondary network bus 110B. Only one of the primary network bus 110A and secondary network bus 110B is utilized for data transmission by an individual node 120 at any time. Although, as discussed in relation to the device swap failure recovery mode, nodes may be utilizing multiple bus for receipt of data packets. Primary network bus 110A is connected to a first network switch 240A$_1$ and a second network switch 240A$_2$. Network switches 240A connect the nodes 120 to the primary network bus 110A through drops 130A. FIG. 1B depicts just two network switches 240A and six nodes 120 connected to primary network bus 110A, although any number of nodes may be connected to any number of switches as long as those numbers remain compliant with the protocol of the network and the limit of switch port numbers. Furthermore, nodes may be connected directly to primary network bus 110A in a manner as depicted in FIG. 1A.

Secondary network bus 110B is connected to a first network switch 240B$_2$, and a second network switch 240B$_2$. Network switches 240B connect the nodes 120 to the secondary network bus 110B through drops 130B. FIG. 1B depicts just two network switches 240B and six nodes 120 connected to secondary network bus 110B, although any number of nodes may be connected to any number of switches as long as those numbers remain compliant with the protocol of the network and the limit of switch port numbers. Furthermore, nodes may be connected directly to secondary network bus 110A in a manner as depicted in FIG. 1A.

Designation of active and stand-by resources is determinable by the user with the guidance that active resources are generally associated with normal data communications and stand-by resources are generally associated with data communications in the event of a failure of some active resource. As an example, primary network bus 110A may be designated for use with active channels while secondary network bus 110B may be designated for use with stand-by channels. It will be appreciated that choice of the active channel is determinable by the user and the designations could be swapped in this example without departing from the scope of the invention. To help illustrate the concept of active and stand-by channels, a few specific examples are provided.

In reference to FIG. 1B, the active channel from node 120*i* to node 120*z* is defined as the path from network interface card 170A of node 120*i*, to drop 130A of node 120*i*, to first switch 240A$_1$ to primary network bus 110A, to second switch 240A$_2$, to drop 130A of node 120*z*, to network interface card 170A of node 120*z*. The secondary channel from node 120*i* to node 120*z* is defined as the path from network interface card 170B of node 120*i*, to drop 130B of node 120*i*, to first switch 240B$_1$, to secondary network bus 110B, to second switch 240B$_2$, to drop 130B of node 120*z*, to network interface card 170B of node 120*z*. Active and stand-by channels include the network interface cards at both ends of the channel.

Similarly, the active channel from node 120*j* to node 120*k* is defined as the path from network interface card 170A of node 120*j*, to drop 130A of node 120*j*, to first switch 240A$_1$, to drop 130A of node 120*k*, to network interface card 170A of node 120*k*. The secondary channel from node 120*j* to node 120*k* is defined as the path from network interface card 170B of node 120*j*, to drop 130B of node 120*j*, to first switch 240B$_1$, to drop 130B of node 120*k*, to network interface card 170B of node 120*k*.

In reference to FIG. 1B and the preceding definitions, a failure of an active channel is defined as a failure of either network switch 240A, primary network bus 110A, any drop 130A or any network interface card 170A. Likewise, a failure of a stand-by channel is defined as a failure of either network switch 240B, secondary network bus 110B, any drop 130B or any network interface card 170B. Failures on an active channel will result in failure recovery, while failures on a stand-by channel will be reported without swapping devices or channels. Note also that the definitions of active and stand-by are dynamic such that when an active channel fails and failure recovery initiates, the stand-by channel chosen for data traffic becomes an active channel.

Figure 2:
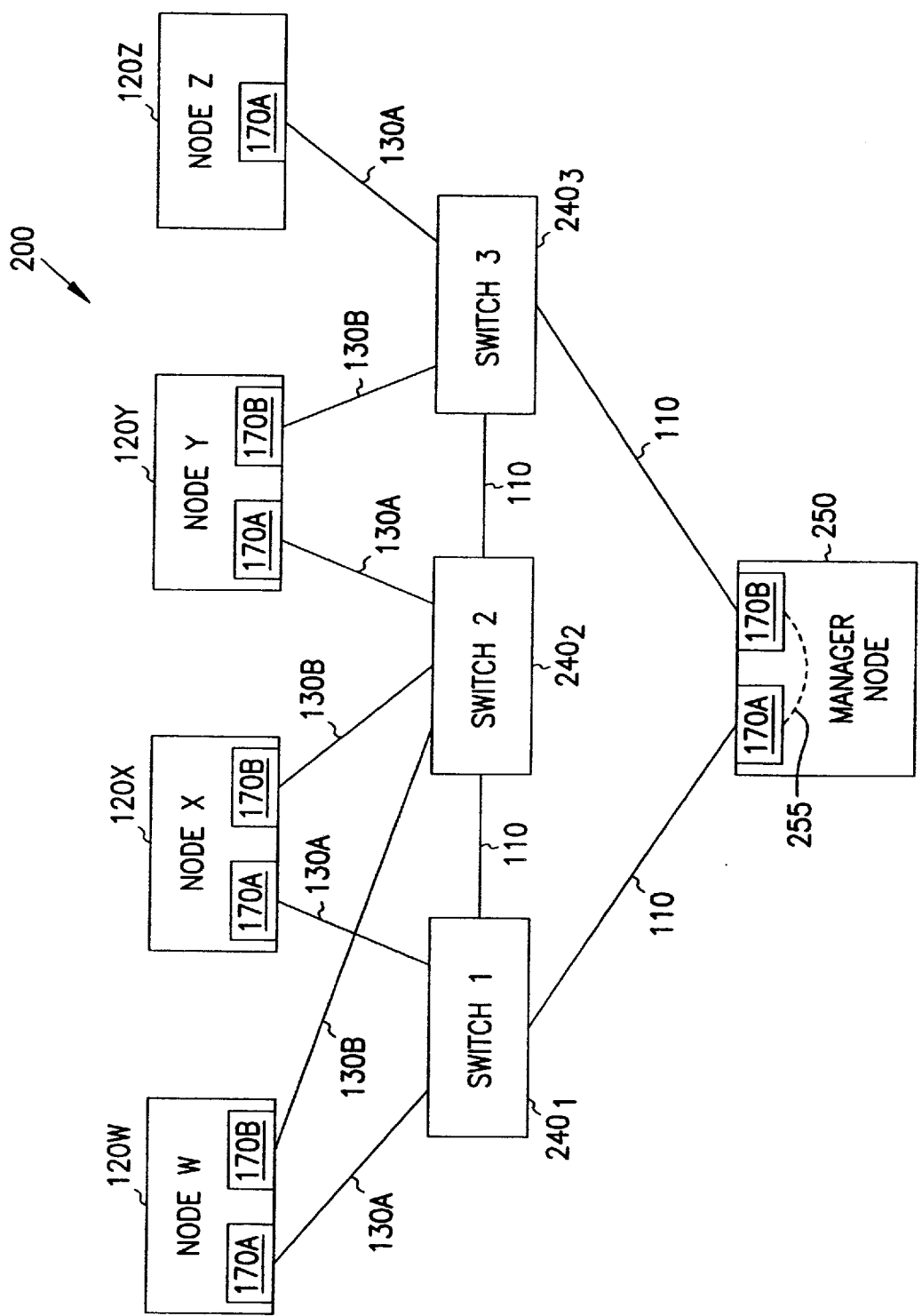
FIG. 2 is a block diagram of one embodiment of a single fault-tolerant network incorporating the invention.

FIG. 2 shows a fault-tolerant network 200 of one embodiment of a single-network system. Fault-tolerant network 200 contains a network bus 110. Network bus 110 is connected to a first network switch 240$_1$, a second network switch 240$_2$ and a third network switch 240$_3$ in an open ring arrangement. Network switches 240 connect the nodes 120 to the network bus 110 through drops 130A and 130B. FIG. 2 depicts just three network switches 240 and four nodes 120 connected to network bus 110, although any number of nodes may be connected to any number of switches as long as those numbers remain compliant with the protocol of the network and the limit of switch port numbers. Furthermore, nodes may be connected directly to network bus 110 in a manner similar to that depicted in FIG. 1A.

Fault-tolerant network 200 further contains a manager node 250 having network interface cards 170A and 170B. Network interface cards 170A and 170B of manager node 250 are utilized for failure detection of network failures during normal operation. If a local failure is detected, no action is taken by manager node 250 as the local failure can be overcome by swapping node communications locally to a stand-by channel. A local failure in fault-tolerant network 200 is characterized by a device failure affecting communications to only one network interface card 170 of a node 120. For example, a local failure between node 120w and node 120z could be a failure of first switch 240$_1$ on the active channel connected to network interface card 170A of node 120w. Swapping data communications to network interface card 170B of node 120w permits communication to node 120z through second switch 240$_2$.

If a network failure is detected, locally swapping data communications to a stand-by channel is insufficient to restore communications. A network failure in fault-tolerant network 200 is characterized by a device failure affecting communications to all network interface cards 170 of a node 120. For example, a network failure between node 120w and 120z could be a failure of second switch 240₂. Swapping communications from network interface card 170A to 170B of node 120w will not suffice to restore communications with node 120z as both channels route through second switch 240₂. In this instance, network interface cards 170A and 170B of manager node 250 close the ring, as shown by the dashed line 255, and allow data communications through manager node 250. With data communications served through manager node 250, communications between node 120w and 120z are restored despite the failure of second switch 240₂.

Designation of active and stand-by resources, i.e., physical network components, is determinable by the user with the guidance that active resources are generally associated with normal data communications and stand-by resources are generally associated with data communications in the event of a failure of some active resource. As an example, network interface cards 170A may be designated for use with active channels while network interface cards 170B may be designated for use with stand-by channels. It will be appreciated that choice of the active channel is determinable by the user and the designations could be swapped in this example without departing from the scope of the invention. However, it should be noted that node 120z is depicted as having only one network interface card 170A. Accordingly, network interface card 170A of node 120z should be designated as an active device as it is the only option for normal data communications with node 120z.

Figure 3A:
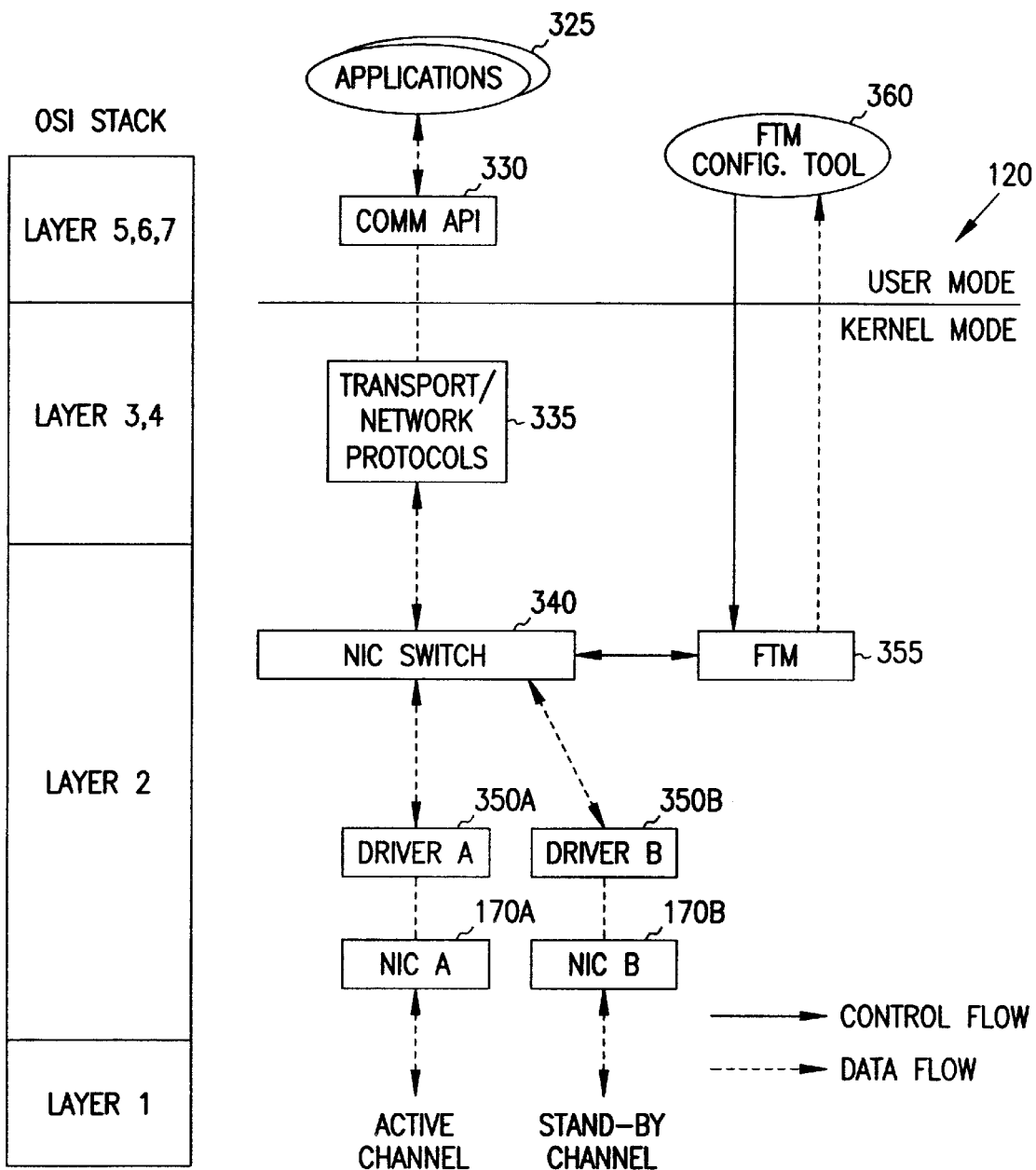
FIG. 3A is a block diagram of an embodiment of a node incorporating one embodiment of the invention.

The architecture of a node 120 containing a fault-tolerance manager according to one embodiment is generally depicted in FIG. 3A. Node 120 of FIG. 3A is applicable to each fault-tolerant network structure, i.e., multiple-network systems and single fault-tolerant networks. FIG. 3A depicts a node 120 containing an applications layer 325 in communication with a communication API (Application Programming Interface) layer 330. Applications layer 325 and communication API layer 330 are generally related to the OSI model layers 5–7 as shown. Node 120 further contains a transport/network protocol layer 335 in communication with the communication API layer 330. The transport/network protocol layer relates generally to the OSI model layers 3 and 4. An NIC switch 340 is in communication with the transport/network protocol layer 335 at its upper end, an NIC driver 350A and NIC driver 350B at its lower end, and a fault-tolerance manager 355. NIC driver 350A drives network interface card 170A and NIC driver 350B drives network interface card 170B. NIC switch 340, fault-tolerance manager 355, NIC drivers 350A and 350B, and network interface cards 170A and 170B generally relate to the OSI model layer 2. Network interface card 170A is connected to the active channel and network interface card 170B is connected to the stand-by channel.

Fault-tolerance manager 355 resides with each node as a stand-alone object. However, fault-tolerance manager 355 of one node communicates over the active and stand-by channels with other fault-tolerance managers of other nodes connected to the network, providing distributed failure detection and recovery capabilities. Fault-tolerance manager 355 is provided with a fault-tolerance manager configuration tool 360 for programming and monitoring its activities. Furthermore, fault-tolerance manager 355 and NIC switch 340 may be combined as a single software object.

Figure 3B:
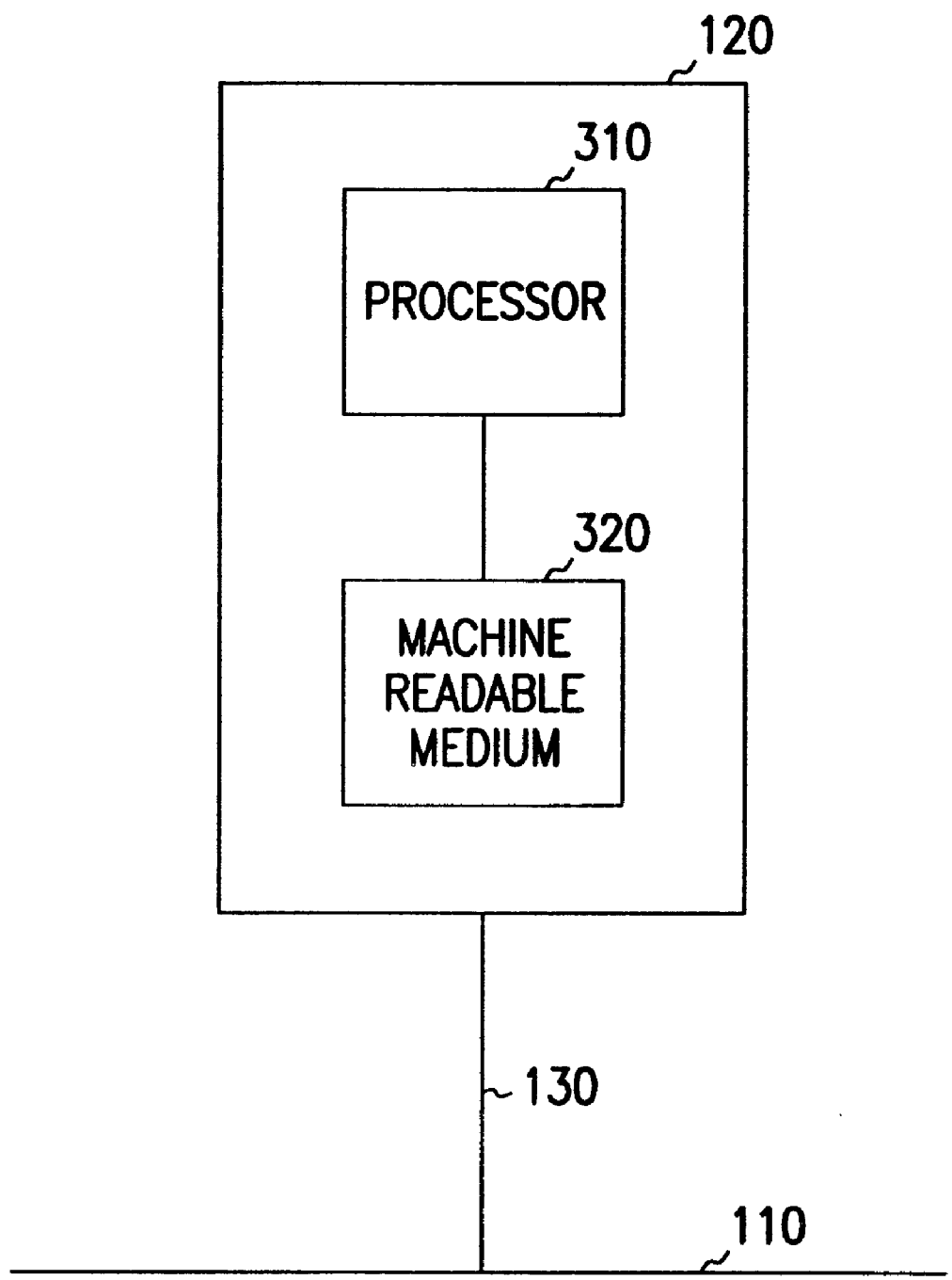
FIG. 3B is a block diagram of an embodiment of a node according to one aspect of the invention.

FIG. 3B depicts the node 120 having a processor 310 and a machine-readable medium 320. Machine-readable medium 320 has instructions stored thereon for causing the processor 310 to carry out one or more of the methods disclosed herein. Although processor 310 and machine-readable medium 320 are depicted as contained within node 120, there is no requirement that they be so contained. Processor 310 or machine-readable medium 320 may be in communication with node 120, but physically detached from node 120.

Figure 4:
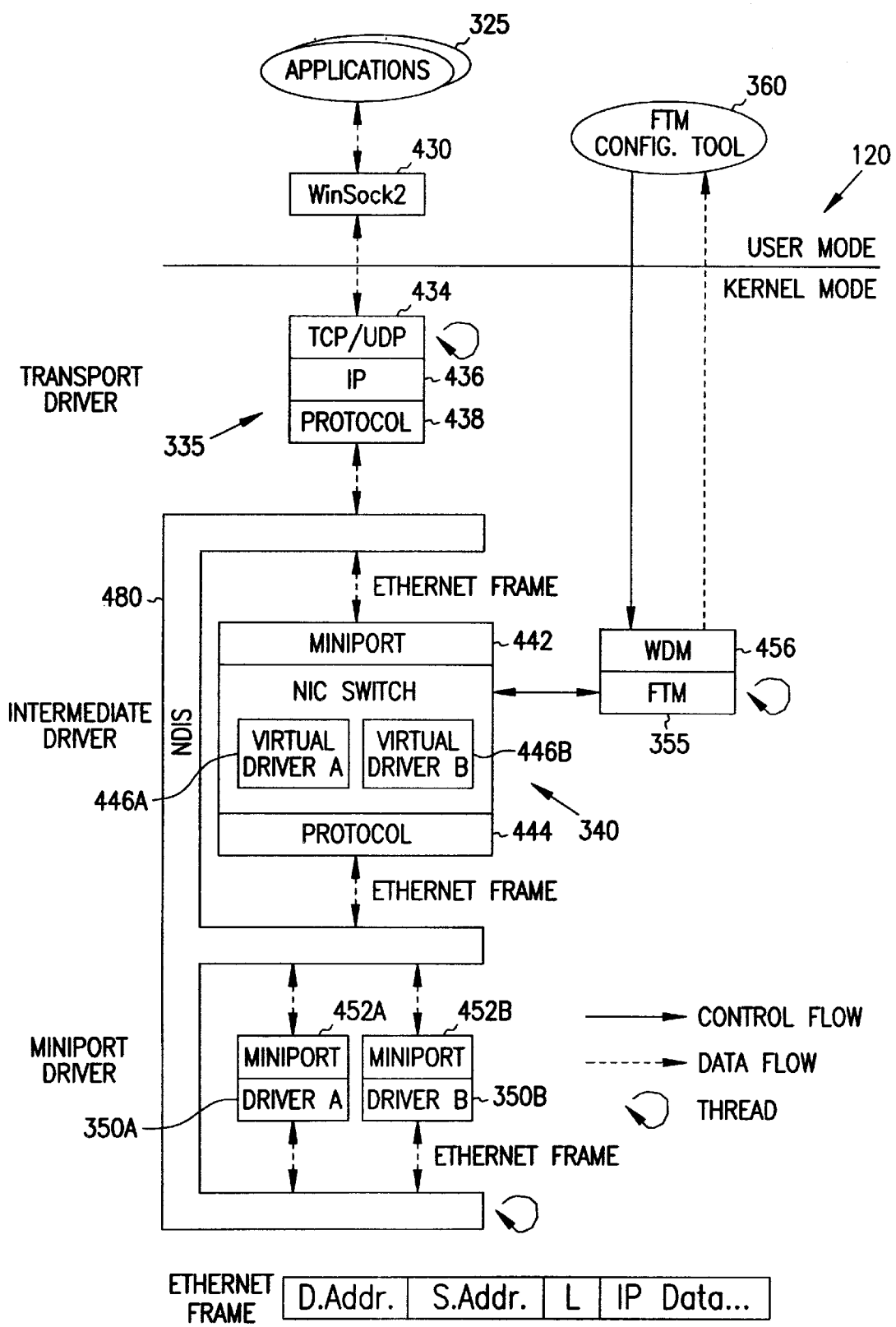
FIG. 4 is a block diagram of an embodiment of a node incorporating one embodiment of the invention on a specific operating system platform.

FIG. 4 depicts a more specific embodiment of a node 120 containing a fault-tolerance manager implemented in a Microsoft® Windows NT platform. With reference to FIG. 4, node 120 of this embodiment contains applications layer 325 in communication with WinSock2 layer 430. WinSock2 layer 430 is in communication with transport/network protocol layer 335. Transport/network protocol layer 335 contains an TCP/UDP (Transmission Control Protocol/User Datagram Protocol) layer 434, an IP (Internet Protocol) layer 436 and NDIS (Network Data Interface Specification) protocol layer 438. TCP and UDP are communication protocols for the transport layer of the OSI model. IP is a communication protocol dealing with the physical layer of the OSI model. TCP is utilized where data delivery guarantee is required, while UDP operates without guarantee of data delivery. NDIS protocol layer 438 provides communication to the Network Device Interface Specification (NDIS) 480.

NDIS 480 is in communication with the NIC switch 340 at both its upper and lower ends. This portion of NDIS 480 is termed the intermediate driver. NDIS 480 is also in communication with the NIC drivers 350A and 350B. This portion of NDIS 480 is termed the miniport driver. NDIS 480 generally provides communication between the transport/network protocol layer 335 and the physical layer, i.e., network buses 110A and 110B.

NIC switch 340 further contains a miniport layer 442, a protocol layer 444 and virtual drivers 446A and 446B. Miniport layer 442 provides communication to NDIS 480 at the upper end of NIC switch 340. Protocol layer 444 provides communication to NDIS 480 at the lower end of NIC switch 340.

NIC drivers 350A and 350B further contain a miniport layer 452A and 452B, respectively. Miniport layer 452A provides communication to NDIS 480 at the upper end of NIC driver 350A. Miniport layer 452B provides communication to NDIS 480 at the upper end of NIC driver 350B.

Fault-tolerance manager 355 is in communication with NIC switch 340. Fault-tolerance manager 355 is provided with a windows driver model (WDM) 456 for communication with fault-tolerance manager configuration tool 360. Windows driver model 456 allows easier portability of fault-tolerance manager 355 across various Windows platform.

The various components in FIG. 4 can further be described as software objects as shown in Table 1. The individual software objects communicate via API calls. The calls associated with each object are listed in Table 1.

TABLE 1

Software Objects and API Calls

| Object | Responsibility | API |
|---|---|---|
| IP Layer 436 | a) direct communication with the physical layer; | MPSendPackets(Adapter, PacketArray, NumberOfPackets) |
| NIC Driver 350 | a) communicate with the physical layer; | CLReceiveIndication(Adapter, MacReceiveContext, HeaderBuffer, HeaderBufferSize, LookaheadBuffer, LookaheadBufferSize, PacketSize) ReceiveDelivery(Adapter, Buffer) |
| | b) route packets to IP Layer 436 or FTM 355 depending upon packet format | |

TABLE 1-continued

Software Objects and API Calls

| Object | Responsibility | API |
|---|---|---|
| FTM 355 | a) perform distributed failure detection;<br>b) direct distributed failure recovery | FTMSend(dest, type, data, Datalength, Adapter)<br>ProcessMsg(Msg)<br>InitFTM( )<br>AmIFirst( )<br>FTMTskewInterrupt( )<br>FTMTpInterrupt( )<br>SetParameters( )<br>ReportChannelStatus( )<br>ForceChannel(Channel_X) |
| FTM configuration tool 360 | a) provide programming of FTM 355 and feedback from FTM 355 | ReportNetworkStatus(data)<br>StartTest(data)<br>ReportTestResult(data)<br>Setparameters(data) |
| NIC Switch 340 | a) direct selection of the active network as determined by FTM 355 | FTMProcessMsg(Content)<br>AnnounceAddr( )<br>UpdateAddr( )<br>Send(Packet, Adapter)<br>IndicateReceive(Packet)<br>SwapChannel( )<br>ForceChannel(Channel_X) |

Failure Detection

Fault-tolerance manager 355 oversees distributed failure detection and failure recovery. Two failure detection modes will be detailed below in the context of fault-tolerant networks of the invention. Other failure detection modes will be apparent to those skilled in the art upon reading this specification. In general, any failure detection mode is sufficient if it is capable of detecting a failure of at least one network component and reporting that failure. For example, in a token-based network protocol, a network failure could be indicated by a failure to receive the token in an allotted time. It is not necessary for the failure detection mode to distinguish the type of network failure, only that it recognize one exists. It will be apparent to those skilled in the art that the descriptions below may be extrapolated to fault-tolerant networks containing more than one stand-by channel.

In one embodiment, the failure detection mode of fault-tolerance manager 355 utilizes message pairs. In this embodiment, each node sends a pair of messages. One message of the message pair is sent across the active channel. The other message of the message pair is sent across the stand-by channel. These message pairs are sent once every $T_p$ period. In this description, these messages will be termed "I_AM_ALIVE" messages.

Upon receiving an "I_AM_ALIVE" message, each receiving node will allow a time $T_{skew}$ to receive the remaining "I_AM_LIVE" message of the message pair. $T_{skew}$ is chosen by the user to set an acceptable blackout period. A blackout period is the maximum amount of time network communications may be disabled by a network failure prior to detection of the failure. Blackout duration is generally defined by a function of $T_p$ and $T_{skew}$ such that blackout period equals $(MaxLoss+1) * T_p+T_{skew}$, where MaxLoss equal the maximum allowable losses of "I_AM_ALIVE" messages as set by the user. It should be apparent that the user has control over the acceptable blackout period, while balancing bandwidth utilization, by manipulating MaxLoss, $T_p$ and $T_{skew}$.

If the second "I_AM_ALIVE" message is not received within time $T_{skew}$, the receiving node will declare a failure and report the failure to fault-tolerance manager 355 in the case where MaxLoss equal zero. In a further embodiment, the receiving node will not report the failure unless the number of failed message pairs exceeds some non-zero MaxLoss. In a still further embodiment, the receiving node will report the failure after two failed message pairs, i.e., MaxLoss equals one. In these previous two embodiments, if a message pair completes successfully prior to exceeding the maximum allowable failures, the counter of failed messages is reset such that the next message pair failure does not result in a reporting of a network failure.

Figure 5:
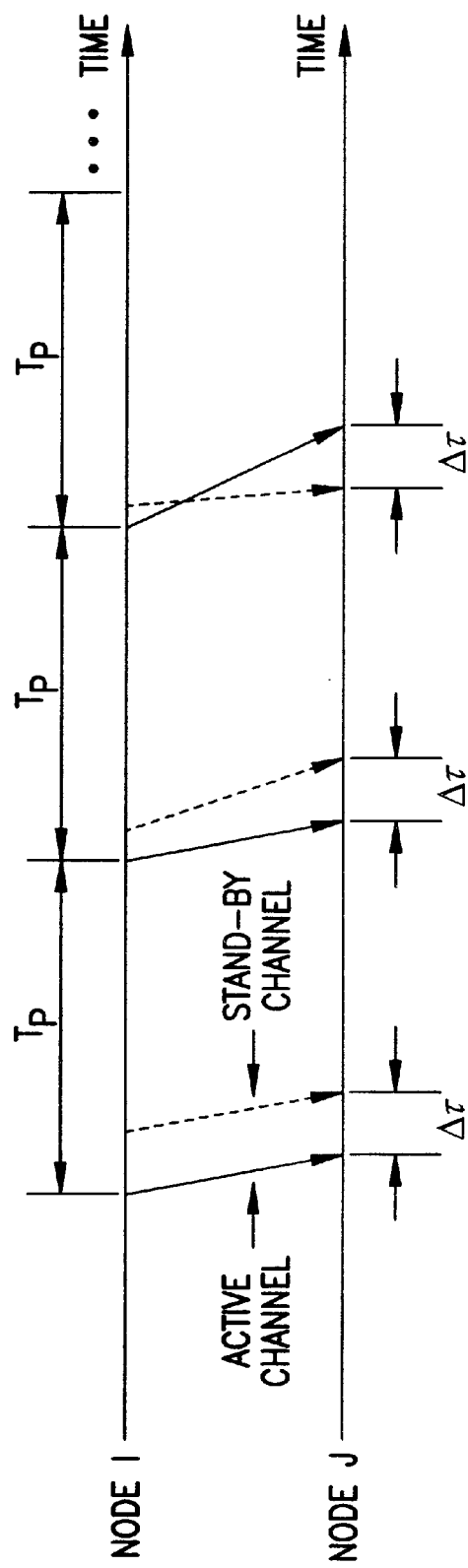
FIG. 5 is a timeline depicting one embodiment of a message pair failure detection mode.

FIG. 5 depicts the chronology of these "I_AM_ALIVE" messages. A sending node labeled as Node i sends pairs of "I_AM_ALIVE" messages to a receiving node labeled as Node j. The messages are sent across the active channel, shown as a solid line, and across the stand-by channel, shown as a dashed line. The absolute delta time of receiving a second "I_AM_ALIVE" message from one network, after receiving a first message from the other network, is compared to $T_{skew}$. As shown, in FIG. 5, the order of receipt is not critical. It is acceptable to receive the "I_AM_ALIVE" messages in an order different from the send order without indicating a failure.

To manage the message pair failure detection mode, each node maintains a message pair table for every node on the network. Upon receipt of a message pair message, the receiving node checks to see if the pair of messages has been received for the sending node. If yes, the receiving node clears the counters in the sender entry in the table. If the remaining message of the message pair has not been received, and the failed message pairs exceeds MaxLoss, the receiving node places the entry of the sending node in a $T_{skew}$ queue as a timer event. The $T_{skew}$ queue facilitates the use of a single timer. The timer events are serialized in the $T_{skew}$ queue. When a timer is set for an entry, a pointer to the entry and a timeout value are appended to the queue of the $T_{skew}$ timer. The $T_{skew}$ timer checks the entries in the queue to decide if a time-out event should be generated.

Figure 6A:
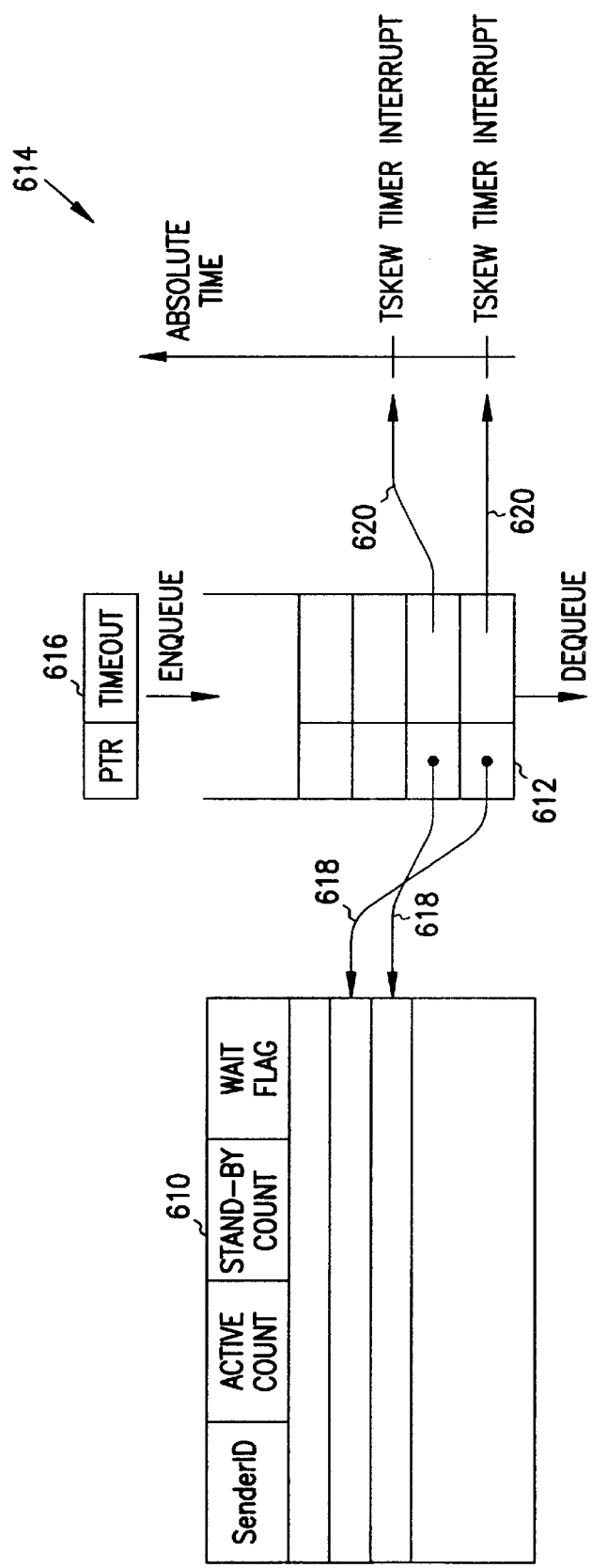
FIG. 6A is a graphical representation of the interaction of a message pair table, a $T_{skew}$ queue and timer interrupts of one embodiment of the invention.

FIG. 6A demonstrates the interaction of the message pair table 610, the $T_{skew}$ queue 612 and the timer interrupts 614. As shown, message pair table 610 contains fields for a sender ID, a counter for "I_AM_ALIVE" messages from the primary network (labeled Active Count), a counter for "I_AM_ALIVE" messages from the secondary network (labeled Stand-By Count), and a wait flag to indicate whether the entry is in a transient state where MaxLoss has not yet been exceeded. Timer event 616 has two fields. The first, labeled Ptr, is a pointer to the message pair table entry generating the timer event as shown by lines 618. The second, labeled Timeout, represents the current time, i.e. the time when the timer entry is generated, plus $T_{skew}$. If the message pair is not received prior to Timeout, the $T_{skew}$ timer will generate a time-out event upon checking the queue as shown by lines 620.

Figure 6B:
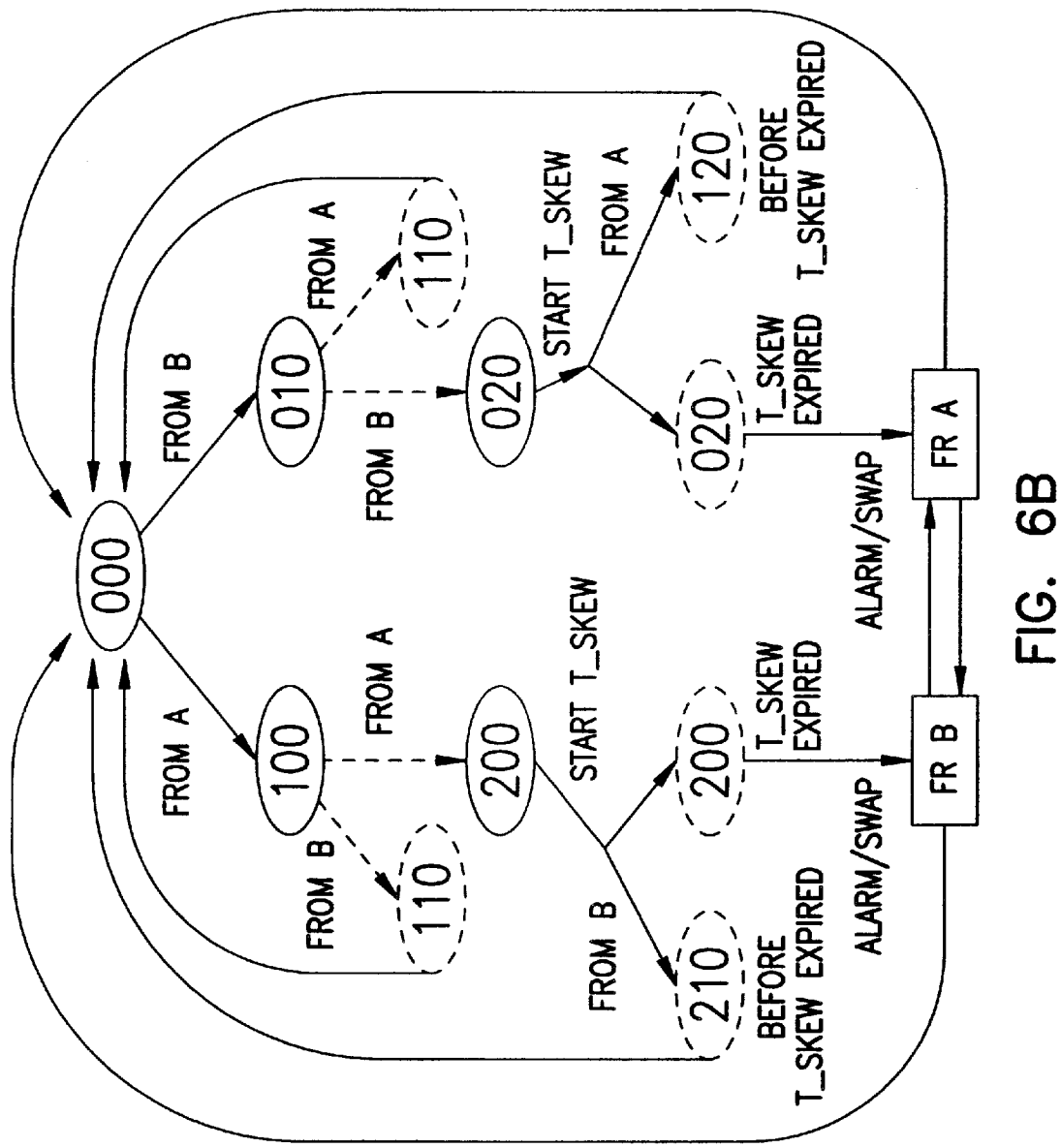
FIG. 6B is a state machine diagram of a message pair failure detection mode prior to failure detection.
Figure 6C:
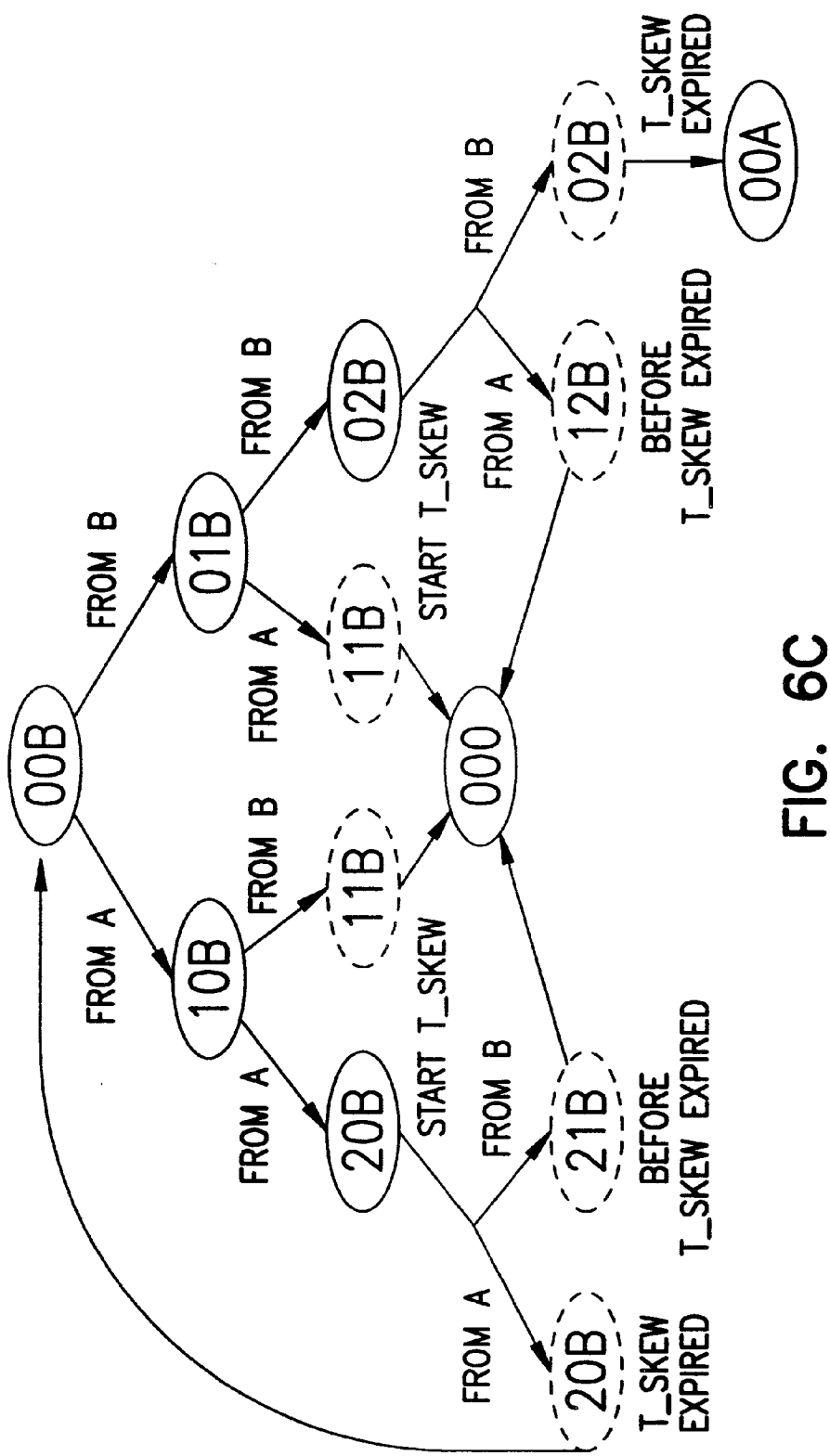
FIG. 6C is a state machine diagram of a message pair failure detection mode following failure detection in one node.

FIGS. 6B and 6C depict state machine diagrams of the failure detection mode just described. FIGS. 6B and 6C assume a MaxLoss of one, thus indicating a failure upon the loss of the second message pair. The notation is of the form (X Y Z), wherein X is the number of messages received from the active channel, Y is the number of messages received from the stand-by channel and Z indicates the channel experiencing a failure. Z can have three possible values in the embodiment described: 0 if no failure is detected, A if the active channel indicates a failure and B if the stand-by channel indicates a failure. Solid lines enclosing (X Y Z) indicate a stable state, while dashed lines indicate a transient state. As shown in FIG. 6B, (2 0 0) indicates a failure on the stand-by channel and (020) indicates a failure on the active channel. In both of these failure cases, the node will report the failure to the network fault-tolerance manager and enter a failure recovery mode in accordance with the channel indicating the failure.

FIG. 6C depicts the state machine diagram following failure on the stand-by channel. There are three possible resolutions at this stage, either the state resolves to (000) to indicate a return to a stable non-failed condition, the state continues to indicate a failure on the stand-by channel, or the state indicates a failure on the active channel. A corresponding state machine diagram following failure on the active channel will be readily apparent to one of ordinary skill in the art.

A second failure detection mode available to fault-tolerance manager 355 is link integrity pulse detection. Link integrity pulse is defined by the IEEE 802.3 standard as being a 100 msec pulse that is transmitted by all compliant devices. This pulse is used to verify the integrity of the network cabling. A link integrity pulse failure would prompt a failure report to the fault-tolerance manager 355.

Fault-tolerance manager 355 is configurable through its fault-tolerance manager configuration tool 360 to selectively utilize one or more failure detection modes. In simple networks with only one hub or switch, it may be desirable to rely exclusively on link integrity pulse detection as the failure detection mode, thus eliminating the need to generate, send and monitor "I_AM_ALIVE" messages. However, it should be noted that one failure detection mode may be capable of detecting failure types that another failure detection mode is incapable of detecting. For example, link integrity pulse may be incapable of detecting a partial bus failure that a message pair failure detection mode would find.

Address Management

Figure 7:
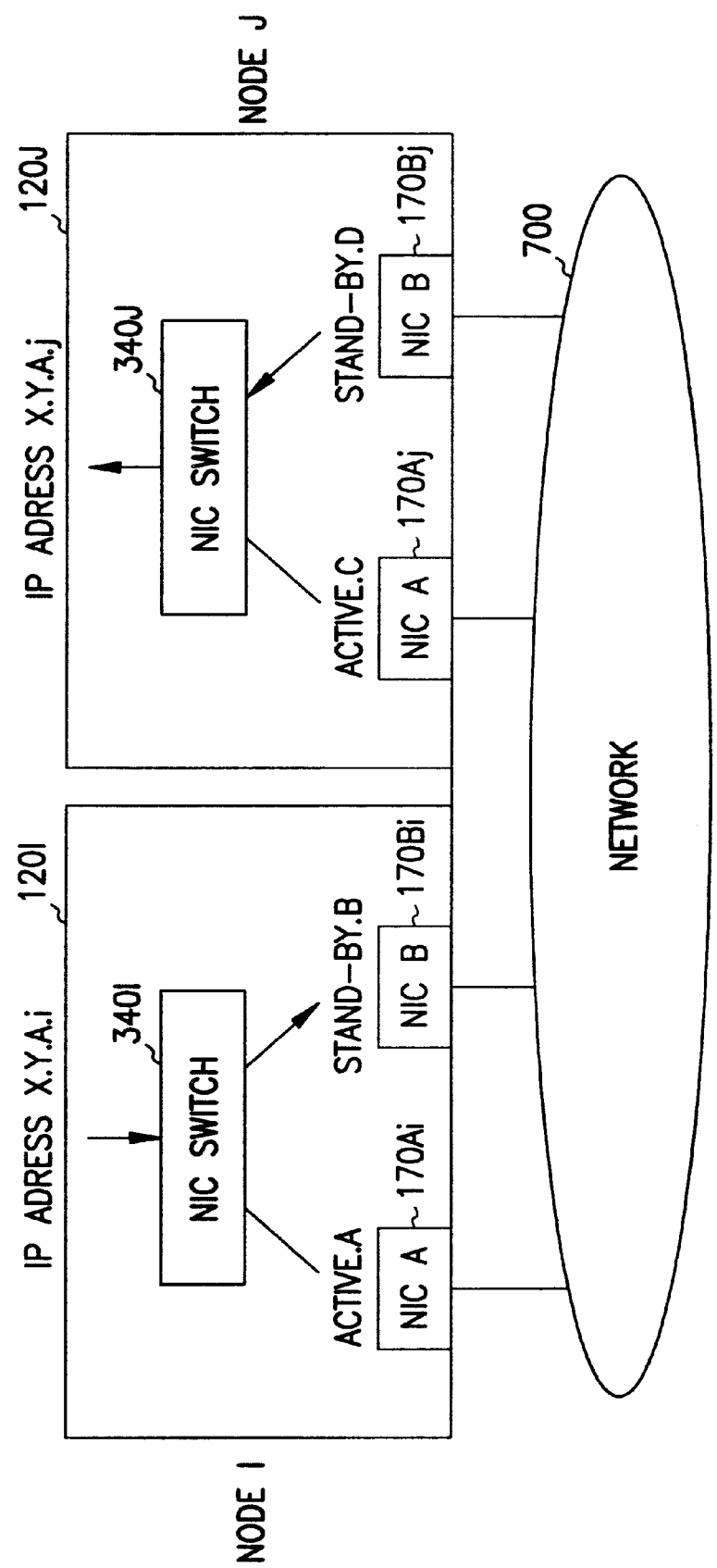
FIG. 7 is a representation of the addressing of two nodes connected to two networks incorporating one embodiment of the invention.

An NIC switch must deal with multiple network addresses. NIC switch 340 utilizes a MAC address table to resolve such address issues. To illustrate this concept, we will refer to FIG. 7. FIG. 7 depicts two nodes 120i and 120j connected to a network 700. Network 700 may be either a multiple-network system or a single fault-tolerant network. With reference to node 120i, network interface card 170Ai is associated with address ACTIVE.a and network interface card 170Bi is associated with network address STANDBY.b. With reference to node 120j, network interface card 170Aj is associated with address ACTIVE.c and network interface card 170Bj is associated with network address STANDBY.d. Now with reference to Table 2, if node 120i desires to send a data packet to node 120j and addressed to ACTIVE.c, NIC switch 340i utilizes the MAC address table. If the primary network is active, NIC switch 340i directs the data packet to address ACTIVE.c on network bus 110A. If the secondary network is active, NIC switch 340i directs the data packet to address STANDBY.d on network bus 110B. On receiving node 120j, NIC switch 120j will receive a valid data packet for either address, ACTIVE.c or STANDBY.d.

TABLE 2

MAC Address Mapping Table

| Destination Node ID | Active Channel Address | Stand-By Channel Address |
|---|---|---|
| i | ACTIVE.a | STANDBY.b |
| j | ACTIVE.c | STANDBY.d |

The MAC address mapping table is automatically populated using a fault-tolerant network address resolution protocol (FTNARP). As a network node initializes, it broadcasts its MAC addresses across the fault-tolerant network using a AnnounceAddr() API call. Each receiving node will add this FTNARP information to its MAC address mapping table using a UpdateAddr() API call. Each receiving node will further reply to the source node with its own MAC addresses if sending node's information did not previously exist in the receiving node's MAC address mapping table. The source node will then populate its MAC address mapping table as a result of these reply addresses.

Figure 8:
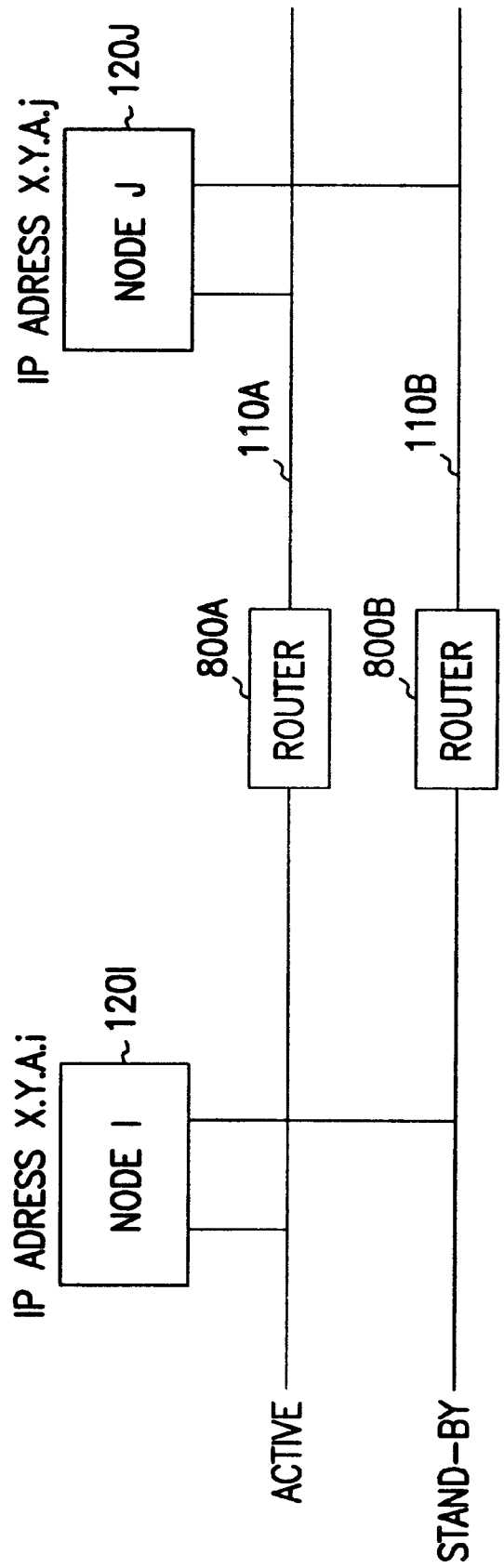
FIG. 8 is a block diagram of one embodiment of a fault-tolerant network incorporating the invention and having routers.

The invention if adaptable to fault-tolerant networks containing routers. An example of such a fault-tolerant network is depicted in FIG. 8. The fault-tolerant network of FIG. 8 contains two nodes 120i and 120j connected to a primary network bus 110A and a secondary network bus 110B. Network buses 110A and 110B contain routers 800A and 800B, respectively, interposed between nodes 120i and 120j.

In this embodiment containing routers, an IP switching function is implemented within the MC switch. The NIC switch contains an IP address mapping table similar to the MAC address mapping table. The IP address mapping table, however, includes only active destinations mapping to reduce memory usage.

Using the IP address mapping table, the NIC switch switches the IP destination address in each frame on the sending node, and switches back the IP address at the receiving node. Upon receiving an FTNARP packet via a stand-by network which includes a node's destination default address, that receiving node sends back an FTNARP reply packet. In order to optimize kernel memory usage, the FTNARP table can contain only active destinations mapping entries similar to the IP address mapping table. In this case, when a node receives an FTNARP packet from a source node, the receiving node responds with an FTNARP reply for the primary and secondary networks. The reply for the primary network, presumed active in this case, is sent up to the IP layer to update the IP address mapping table. The reply for the secondary network is kept in the FTNARP table.

Failure Recovery Channel Swap Mode

Channel swap failure recovery mode can best be described with reference to FIG. 1B for the case of a multiple-network system and FIG. 2 for the case of a single fault-tolerant network. In this failure recovery mode, all nodes are directed to swap data transmission to a stand-by channel.

With reference to FIG. 1B, if any node 120 detects and reports a failure, all nodes will be directed to begin using the stand-by network. In this instance, data traffic between nodes 120i and 120x would be through network interface card 170Ai, primary network bus 110A and network interface card 170Ax before failure recovery. After failure recovery, data traffic between nodes 120i and 120x would be through network interface card 170Bi, secondary network bus 110B and network interface card 170Bx.

With reference to FIG. 2, if any node 120 detects and reports a failure, all nodes will be directed to begin using the stand-by network. However, there is no physical stand-by network in the case of fault-tolerant network 200. In this configuration, a logical active network and a logical stand-by network are created by utilizing a first MAC multicast group to group all active channel addresses as a logical active network, and a second MAC multicast group to group all stand-by channel addresses as a logical stand-by network Network interface cards 170A and 170B of manager node 250 are linked to close the ring of network bus 110 to facilitate communications on the logical stand-by network if the manager node 250 detects a network failure.

Failure Recovery: Device Swap Mode

An alternative failure recovery mode is the device swap mode. In this failure recovery mode, only those nodes detecting a failure will be directed to swap data transmission to the stand-by channel. All nodes accept valid data packets from either channel before and after failure recovery. Again with reference to FIG. 1B (for the case of multiple-network systems), if node 120i detects and reports a network failure, it will be directed to begin using the stand-by channel. In this instance, data traffic from node 120i to node 120x would be through network interface card 170Ai, primary network bus 110A and network interface card 170Ax before failure recovery. After failure recovery, data traffic from node 120i would be directed to the stand-by channel. Accordingly, post-failure data traffic from node 120i to node 120x would be through network interface card 170Bi, secondary network bus 110B and network interface card 170Bx. Node 120x would continue to send data using its active channel if it does not also detect the failure. Furthermore, node 120x will accept valid data packets through either network interface card 170Aj or network interface card 170Bj. The device swap failure recovery mode works analogously in the case of the single fault-tolerant network.

Exemplary Implementations

Figure 9:
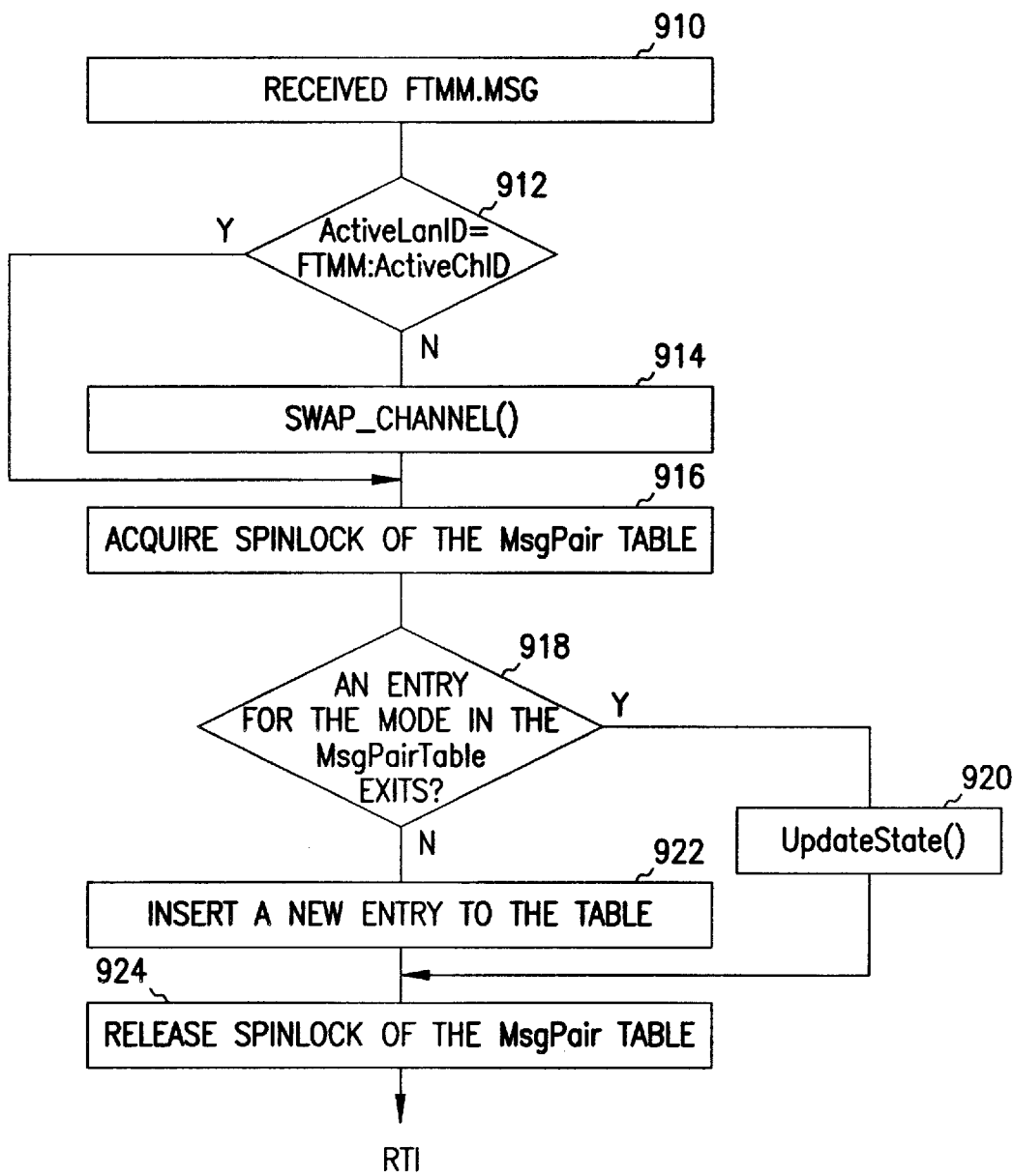
FIG. 9 is a flowchart of one message interrupt routine.

FIG. 9 depicts a flowchart of one message interrupt routine. As shown in FIG. 9, a node receives a fault-tolerance manager message (FTMM) from another node at 910. The fault-tolerance manager then checks to see if the active channel ID of the node is the same as the active channel ID indicated by the message at 912. If the active LAN ID of the node is different, the node runs Swap_Channel() at 914 to modify the active LAN ID of the node. The fault-tolerance manager then acquires the spinlock of the message pair table at 916. The spinlock is a resource mechanism for protecting shared resources. The fault-tolerance manager checks to see if an entry for the sending node exists in the message pair table at 918. If so, the entry is updated through UpdateState() at 920. If not, an entry is added to the table at 922. The spinlock is released at 924 and process is repeated.

Figure 10A:
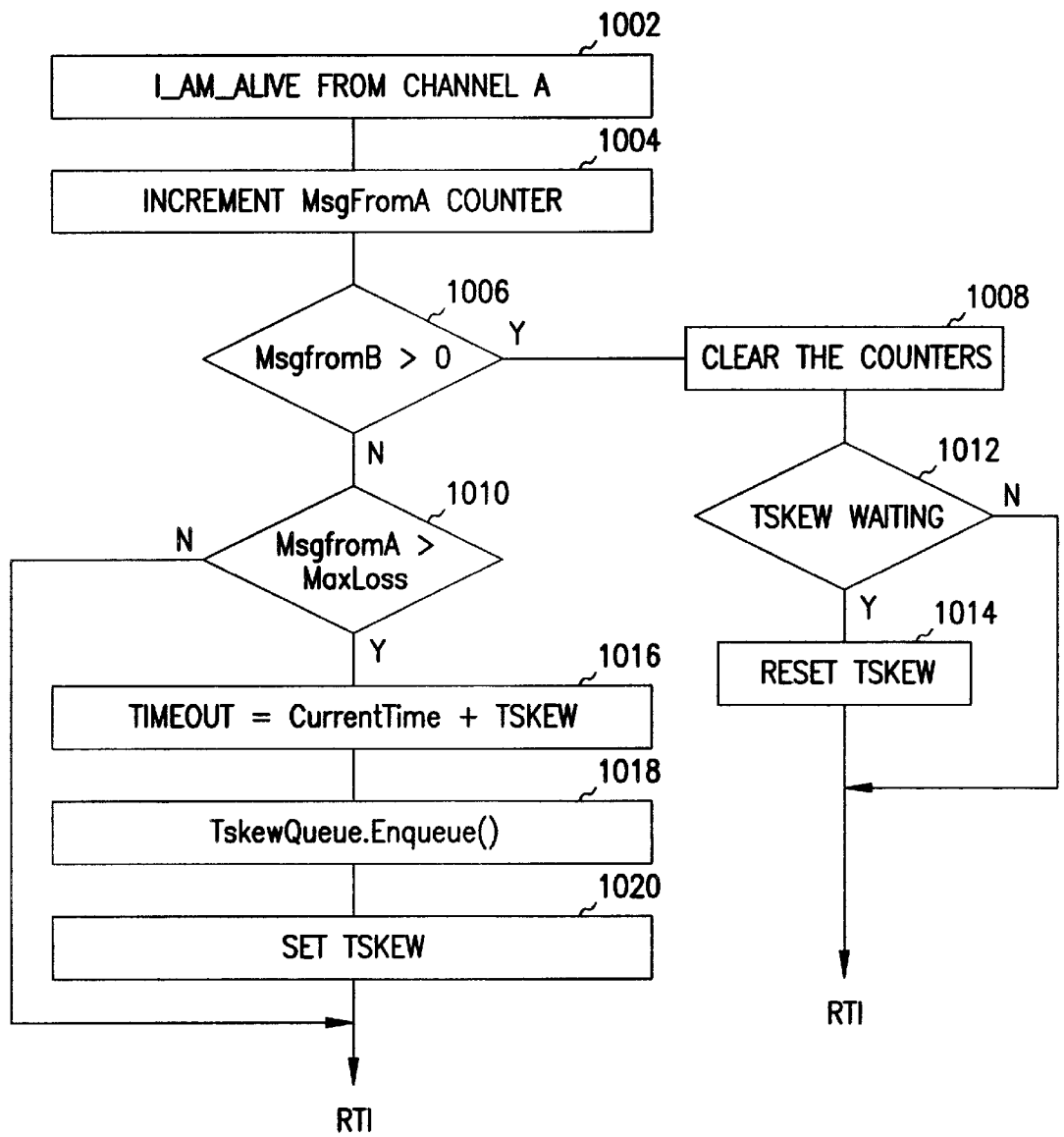
FIG. 10A is a flowchart of one embodiment of the message pair processing.
Figure 10B:
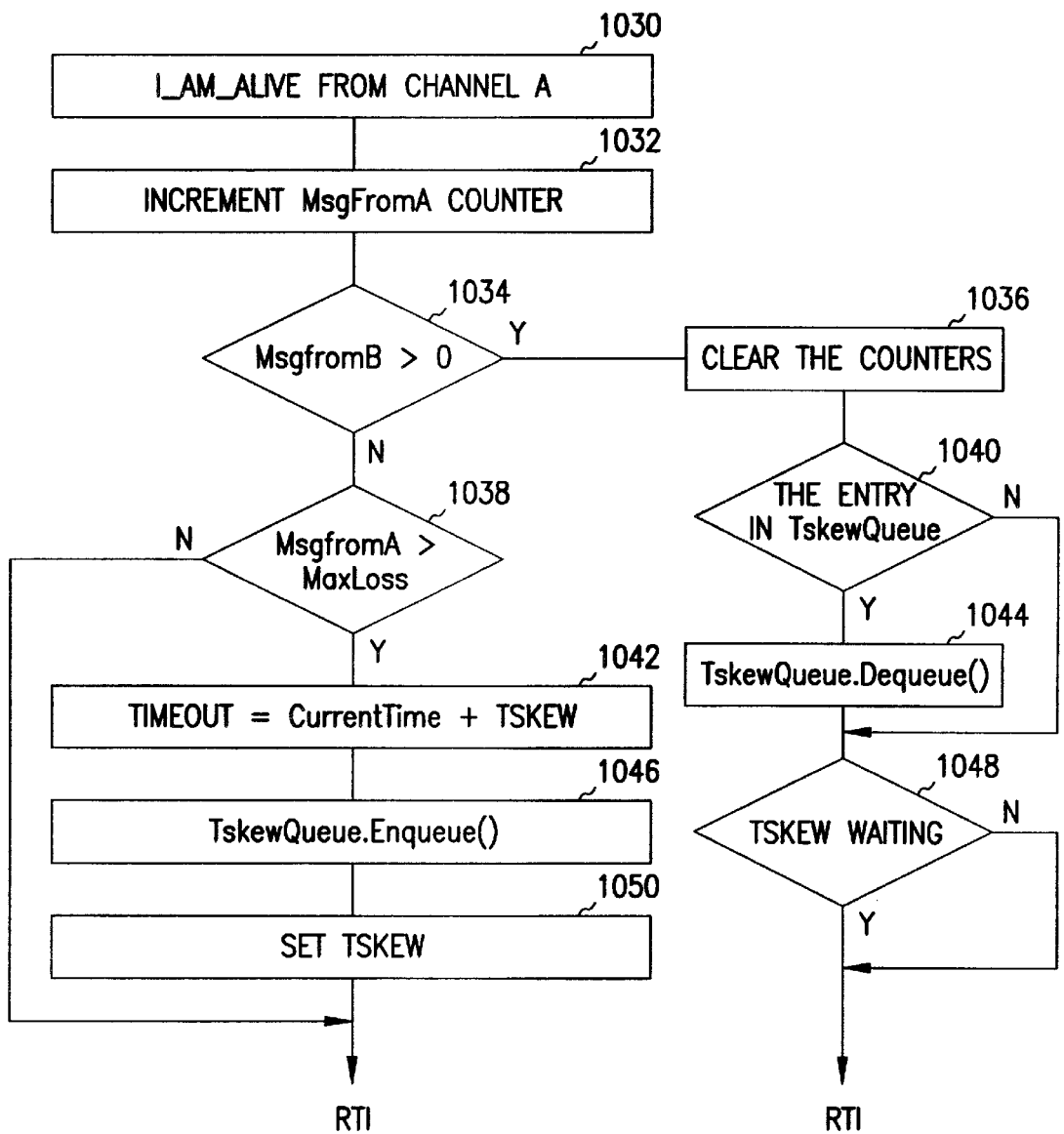
FIG. 10B is a variation on the message pair processing.

FIG. 10A depicts a flowchart of one embodiment of the message pair table operation for the ProcessMsgPair() routine. As shown in FIG. 10, an I_AM_ALIVE message is received from a sending node on the active channel at 1002. The counter for the sending node's entry in the receiving node's message pair table is incremented in 1004. If the number of messages received from the sending node on the stand-by channel is greater than zero at 1006, both counters are cleared at 1008 and $T_{skew}$, if waiting at 1012, is reset at 1014. If the number of messages received from the sending node on the stand-by channel is not greater than zero at 1006, the number of messages from the sending node on the active channel is compared to MaxLoss at 1010. If MaxLoss is exceeded at 1010, a timeout is generated at 1016 to equal the current time plus $T_{skew}$. This timeout entry, along with its pointer, is added to the $T_{skew}$ queue at 1018, $T_{skew}$ is set at 1020 and the process repeats. If MaxLoss is not exceeded at 1010, a timeout is not generated and no entry is placed in the queue.

FIG. 110B depicts a variation on the flowchart of 110A. In this embodiment, upon clearing the counters at 1036, the queue entry is checked at 1040 to see if it is in the $T_{skew}$ queue. If so, it is dequeued from the queue at 1044. Furthermore, $T_{skew}$ is not reset regardless of whether it is waiting at 1048.

Figure 10C:
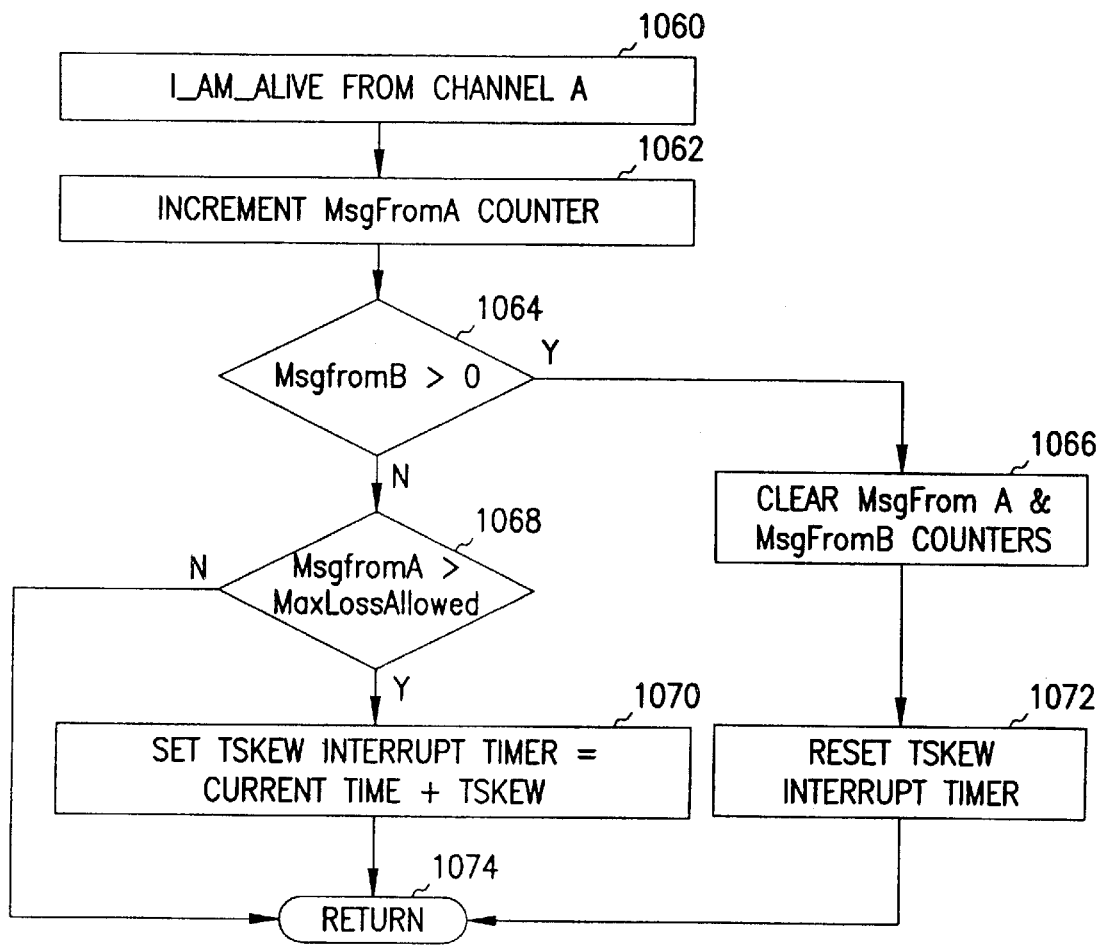
FIG. 10C is a variation on the message pair processing.

FIG. 10C of operation of the ProcessMsgPair() routine. FIG. 10A depicts a flowchart of one embodiment of the message pair table operation for the ProcessMsgPair() routine. As shown in FIG. 110C, an I_AM_ALIVE message is received from a sending node on the active channel at 1060. The counter for the sending node's entry in the receiving node's message pair table is incremented in 1062. If the number of messages received from the sending node on the stand-by channel is greater than zero at 1064, the MsgFromA counter and the MsgFromB counter are cleared at 1066 and the $T_{skew}$ interrupt timer is reset at 1072. If the number of messages received from the sending node on the stand-by channel is not greater than zero at 1064, the number of messages from the sending node on the active channel is compared to MaxLoss at 1068. If MaxLoss is exceeded at 1068, the interrupt timer is generated at 1070 to equal the current time plus $T_{skew}$. If MaxLoss is not exceeded at 1068, the interrupt timer is not generated. In either case, the process repeats at 1074 for receipt of a next I_AM_ALIVE message.

Figure 11A:
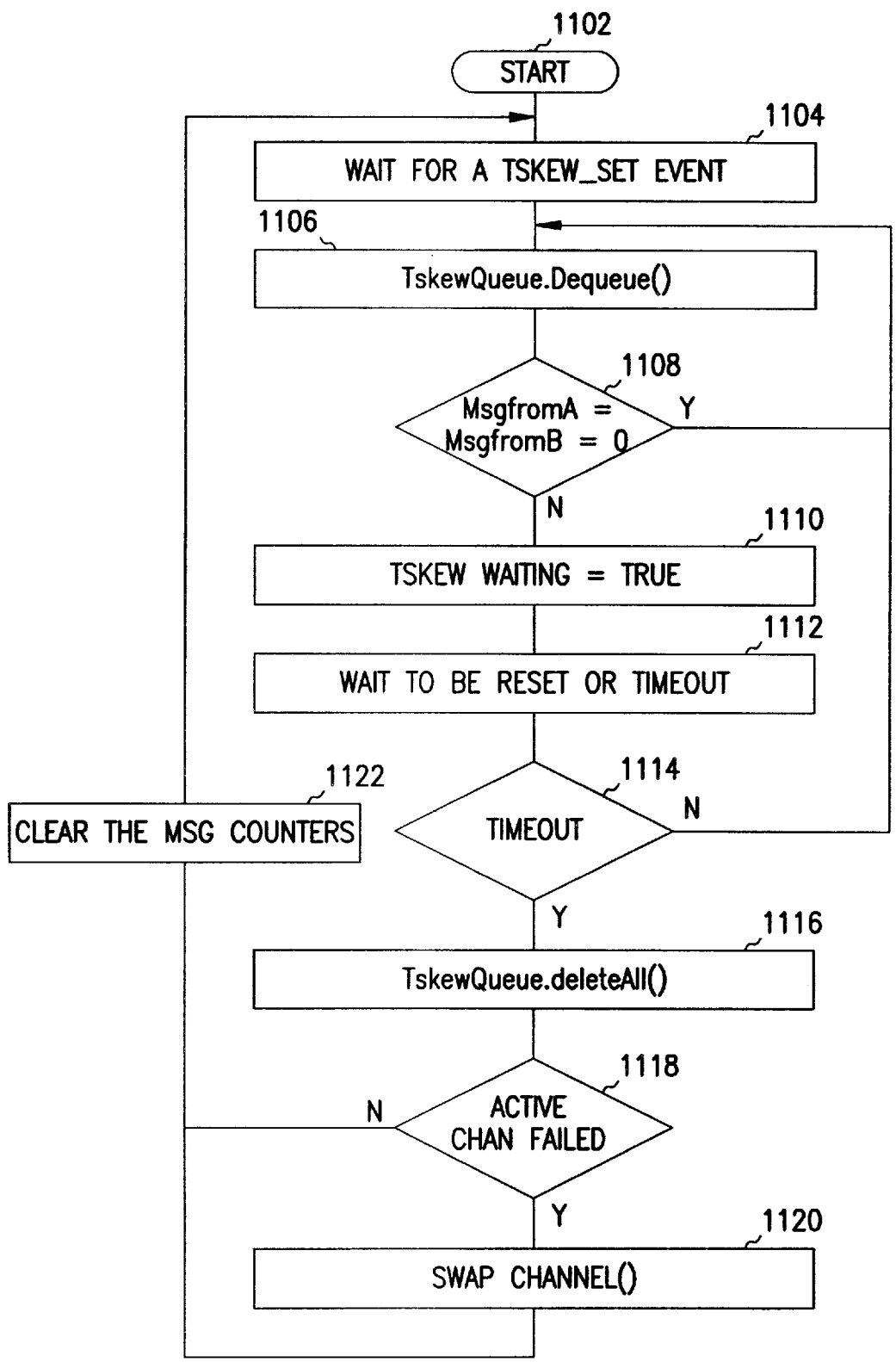
FIG. 11A is a flowchart of one embodiment of the $T_{skew}$ timer operation.

FIG. 11A depicts a flowchart of one embodiment of the $T_{skew}$ timer operation. Starting at 11 02, the timer waits for a timer event to be set at 1104. The oldest entry in the queue is dequeued at 1106. If the counter of messages from the active channel and the counter of messages from the stand-by channel are both at zero at 1108, control is transferred back to 1106. If this condition is not met, the wait flag is set to TRUE at 1110. The timer waits for a reset or timeout at 1112. If a reset occurs at 1114, control is transferred back to 1106. If a timeout occurs at 1114, the $T_{skew}$ queue is cleared at 1116. The timer then determines which channel indicated the failure at 1118. If the stand-by channel indicated a failure at 1118, the message counters are cleared at 1122 and control is transferred back to 1104. If the active channel indicated a failure at 1118, SwapChannel() is called at 1120 to swap communications to the secondary network.

Figure 11B:
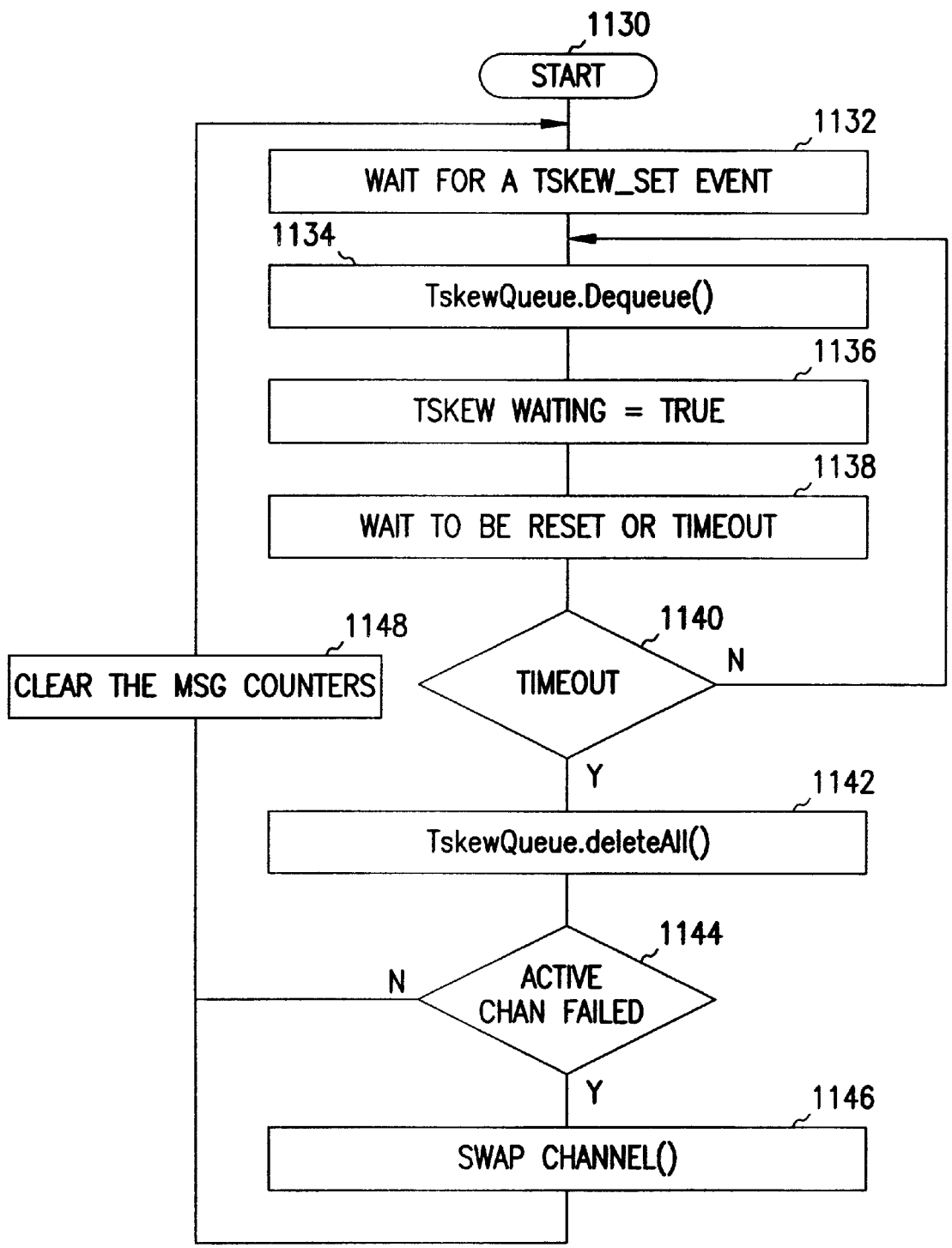
FIG. 11B is a flowchart of one embodiment of the $T_{skew}$ timer operation.

FIG. 11B depicts a flowchart of one embodiment of the $T_{skew}$ timer operation. Starting at 1130, the timer waits for a timer event to be set at 1132. The oldest entry in the queue is dequeued at 1134. The wait flag is set to TRUE at 1134. The timer waits for a reset or timeout at 1138. If a reset occurs at 1140, control is transferred back to 1134. If a timeout occurs at 1140, the $T_{skew}$ queue is cleared at 1142. The timer then determines which channel indicated the failure at 1144. If the stand-by channel indicated a failure at 1144, the message counters are cleared at 1148 and control is transferred back to 1132. If the primary network indicated a failure at 1144, SwapChannel() is called at 1146 to swap communications to the secondary network.

Figure 12A:
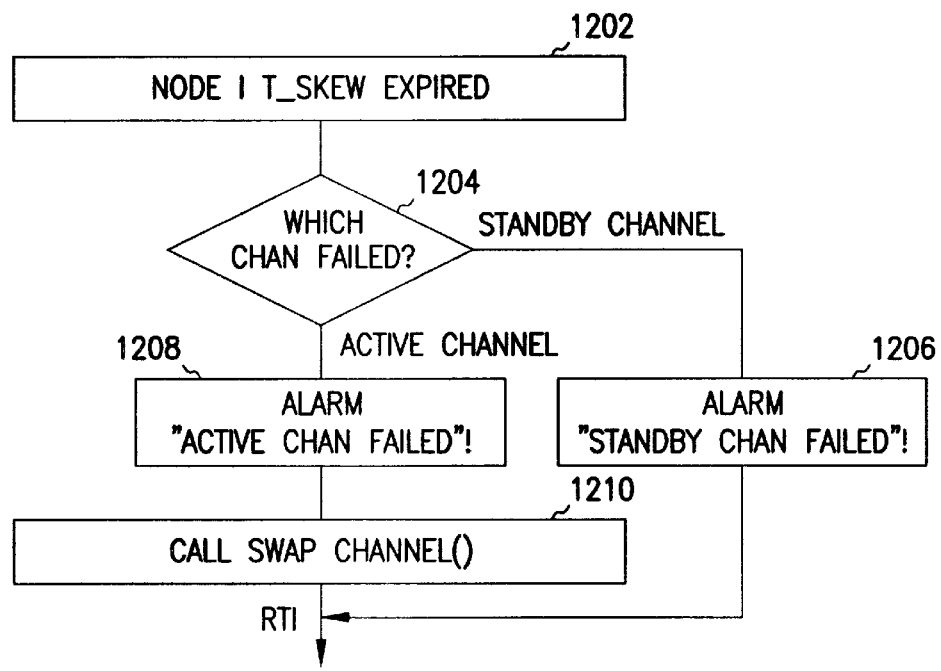
FIG. 12A is a flowchart of one embodiment of a $T_{skew}$ timer interrupt routine.

FIG. 12A depicts a flowchart of one embodiment of a $T_{skew}$ timer interrupt routine. As shown, a node i detects an expired $T_{skew}$ at 1202. It then determines which channel indicates a failure at 1204. If the stand-by channel indicates a failure at 1204, an alarm is reported to the fault-tolerance manager at 1206, but no change is made to the active channel. If the active channel indicates the failure at 1204, an alarm is reported to the fault-tolerance manager at 1208 and SwapChannel() is called at 1210 to change communications from the active channel to the stand-by channel.

Figure 12B:
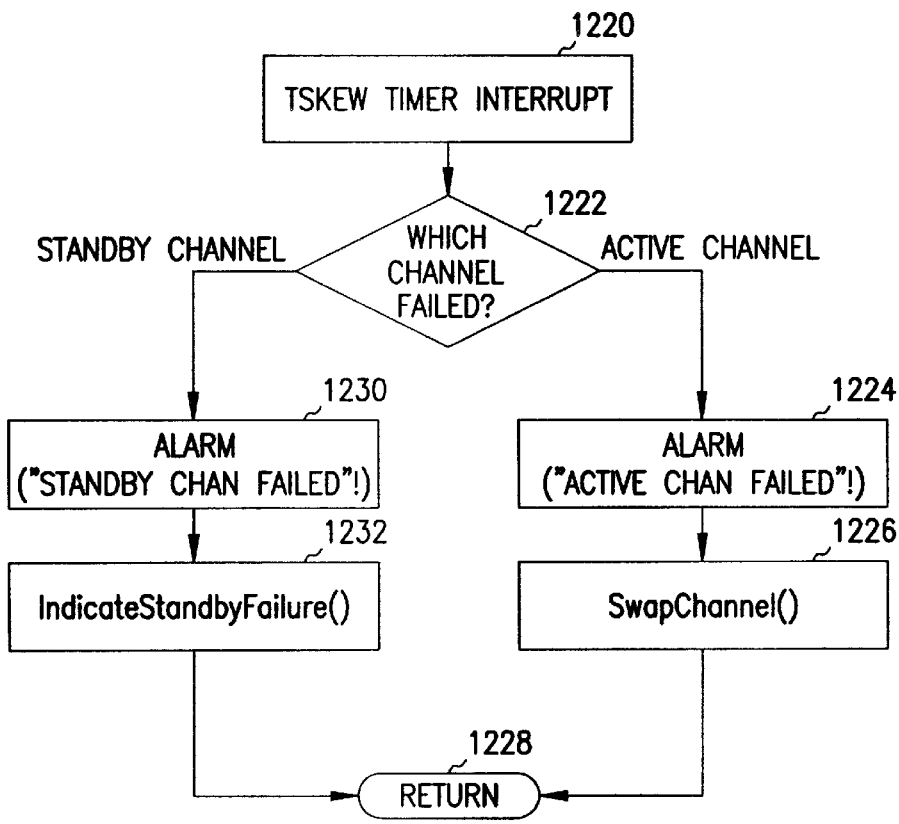
FIG. 12B is a flowchart of one embodiment of a $T_{skew}$ timer interrupt routine.

FIG. 12B depicts a flowchart of another embodiment of a $T_{skew}$ timer interrupt routine. As shown, a node i detects an expired $T_{skew}$ at 1220. It then determines which channel indicates a failure at 1222. If the stand-by channel indicates a failure at 1222, an alarm is reported to the fault-tolerance manager at 1230, then a call is made to IndicateStandbyFailure(). If the active channel indicates the failure at 1222, an alarm is reported to the fault-tolerance manager at 1224 and SwapChannel() is called at 1226 to change communications from the active channel to the stand-by channel. The process is repeated at 1228.

Figure 13:
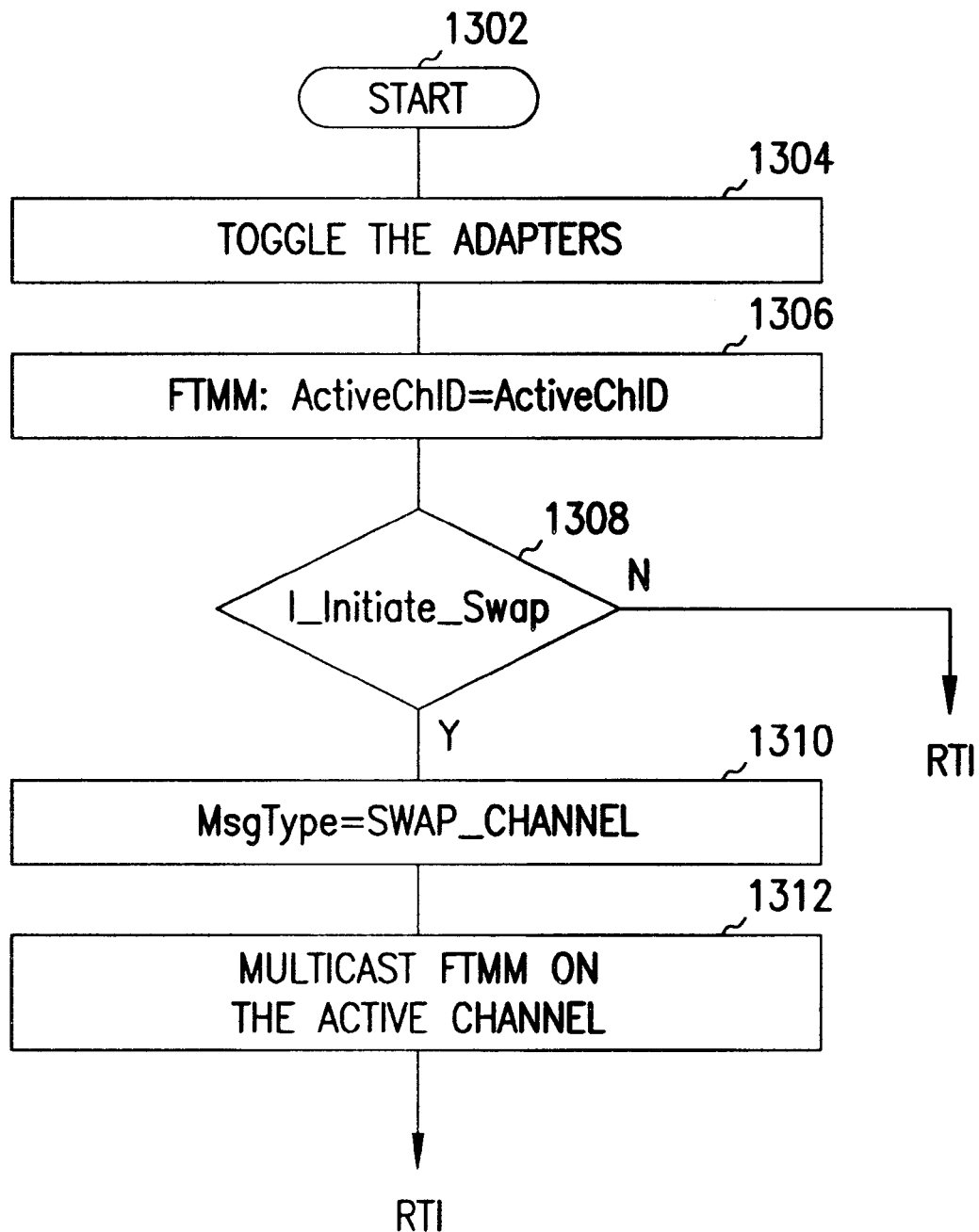
FIG. 13 is a flowchart of one embodiment of a routine for channel swapping.

FIG. 13 depicts a flowchart of one embodiment of the SwapChannel() routine. After initializing at 1302, a node toggles its adapters at 1304 to swap channels. The fault-tolerance manager active channel ID message is set to the active channel ID at 1306. The node checks to see who initiated the swap at 1308. If the node was directed to swap channels by another node, the process is complete and ready to repeat. If the node initiated the swap, a fault-tolerance manager SWAP_CHANNEL message is generated at 1310 and sent across the active network at 1312 by multicast.

Figure 14:
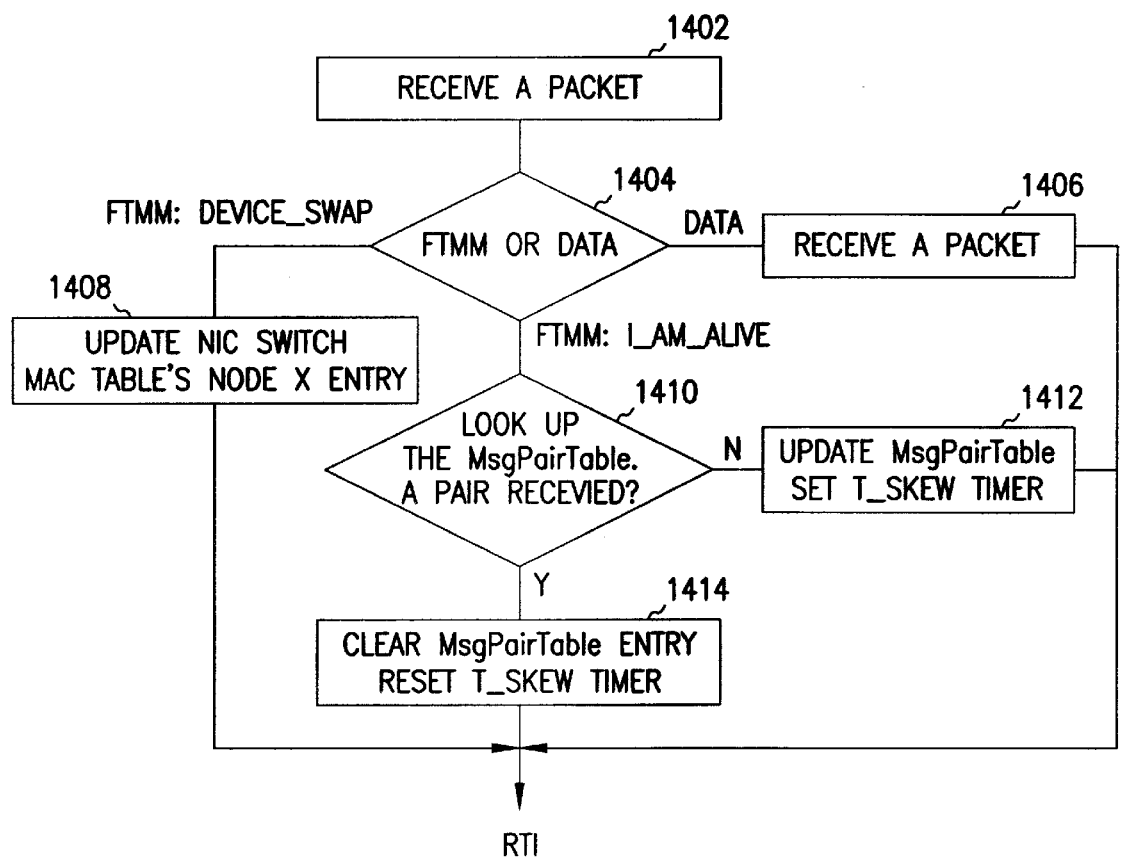
FIG. 14 is a flowchart of one embodiment of a message interrupt routine associated with a device swap failure recovery mode.

FIG. 14 depicts a flowchart of one embodiment of a message interrupt routine associated with a device swap failure recovery mode. As shown, a node receives a packet at 1402. The node then decides at 1404 if it is a fault-tolerance manager message or data. If data, the packet is passed up to the applications layer at 1406. If a fault-tolerance manager message, the node further determines at 1404 if it is a DEVICE_SWAP message or an I_AM_ALIVE message. If a DEVICE_SWAP message, the MAC address mapping table of the NIC switch is updated, along with the active channel flag, at 1408. If an I_AM_ALIVE message, the node checks the message pair table at 1410 to see if a pair of I_AM_ALIVE messages have been received. If so, the message pair table entry is cleared and the $T_{skew}$ timer is reset at 1414. If a pair has not been received, the message pair table is updated and the $T_{skew}$ timer is set at 1412.

Figure 15:
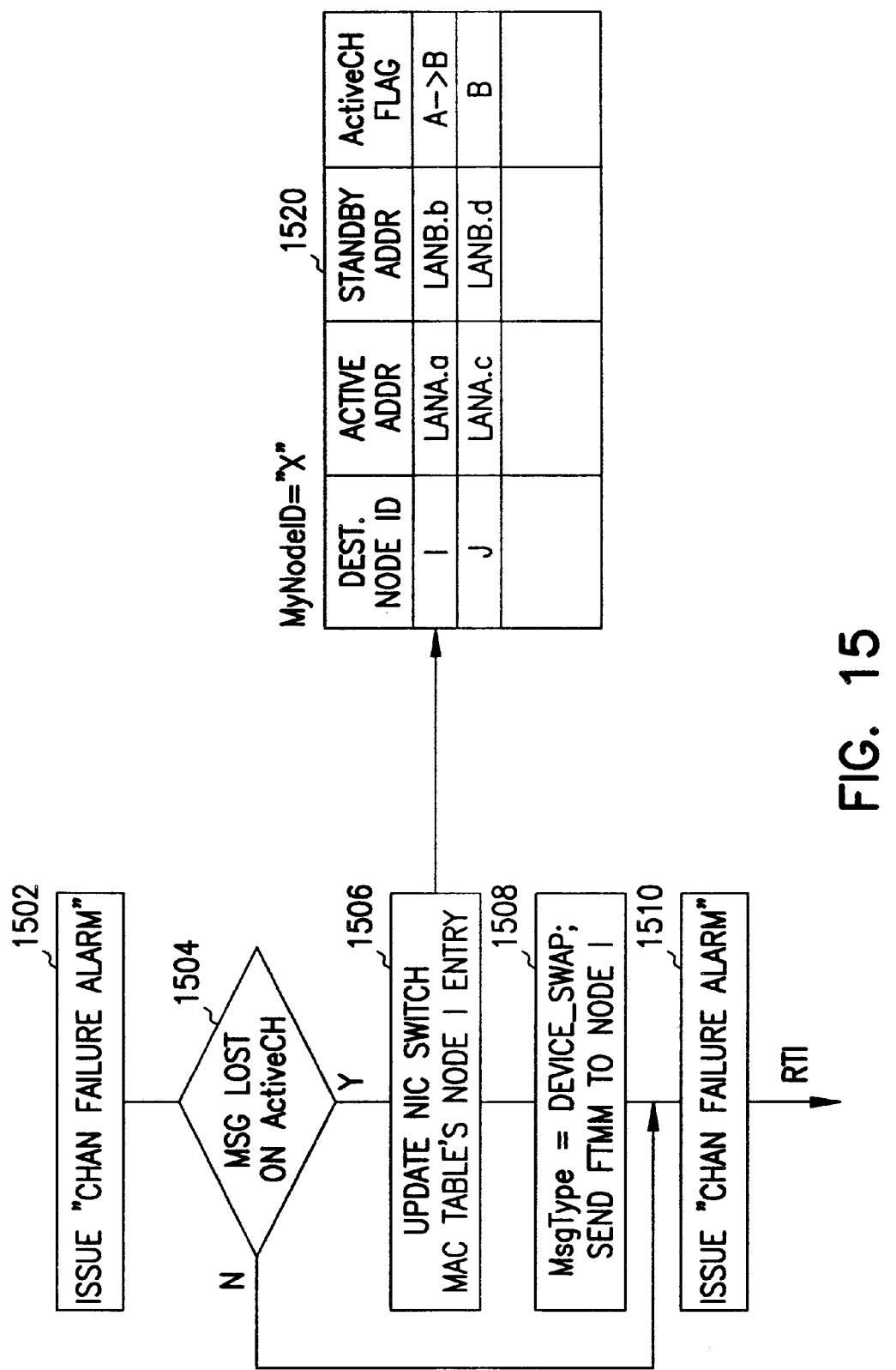
FIG. 15 is a flowchart of one embodiment of a $T_{skew}$ timer interrupt associated with a device swap failure recovery mode.

FIG. 15 depicts a flowchart of one embodiment of a $T_{skew}$ timer interrupt associated with a device swap failure recovery mode. If $T_{skew}$ has expired for a sending node i at 1502, the receiving node checks at 1504 to see if the failure is on the active channel or the stand-by channel. If the failure is on the stand-by channel at 1504, the receiving node issues an alarm to the fault-tolerance manager at 1510 indicating failure of the stand-by channel. If the failure is on the active channel at 1504, the MAC address mapping table of the NIC switch is updated at 1506. As shown in box 1520, the update involves setting the active channel flag for node i from A to B to indicate that future communication should be directed to node i's STANDBY address. A fault-tolerance manager DEVICE_SWAP message is generated and sent to the sending node at 1508. The receiving node then issues an alarm to the fault-tolerance manager at 1510 to indicate a failure of the active channel.

Figure 16:
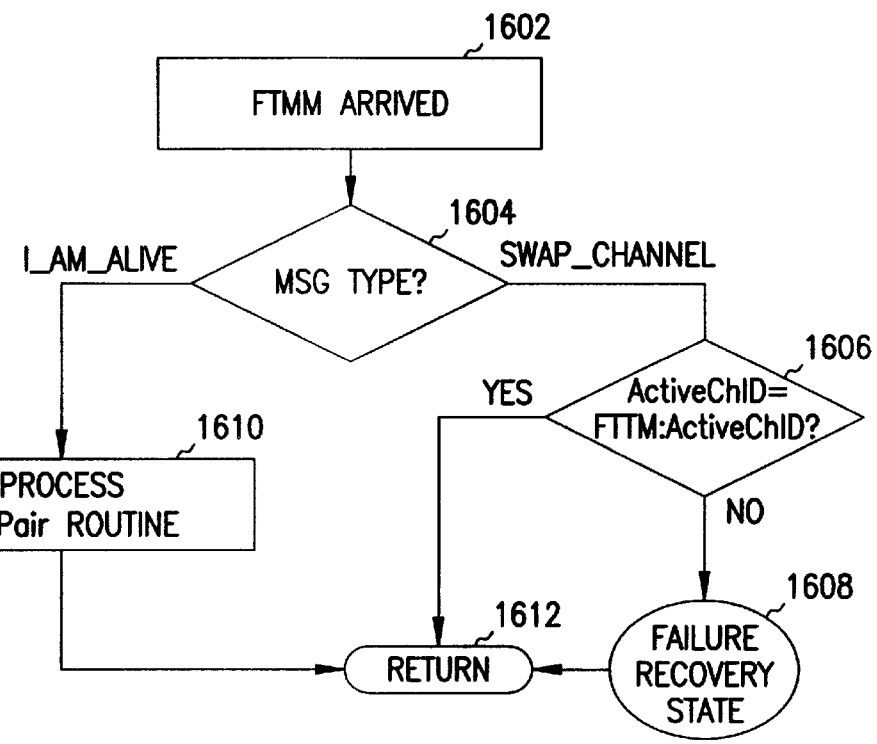
FIG. 16 is a flowchart of one embodiment of a fault-tolerance manager message handling routine.

FIG. 16 depicts a flowchart of one embodiment of a ProcessMsg() routine. A fault-tolerance manager message is received at 1602. If the message is an I_AM_ALIVE message at 1604, a ProcessMsgPair() call is made at 1610 and the process repeats at 1612. If the message is a SWAP_CHANNEL message, the node determines if the active channel ID of the node is the same as the active channel ID of the message. If yes, no action is taken and the process repeats at 1612. If the active channel ID of the node is different than the message, the node enters a failure recovery state at 1608, swapping channels if the node utilizes a channel swap failure recovery mode and taking no action if the node utilizes a device swap failure recovery mode. Control is then transferred from 1608 to 1612 to repeat the process.

Figure 17:
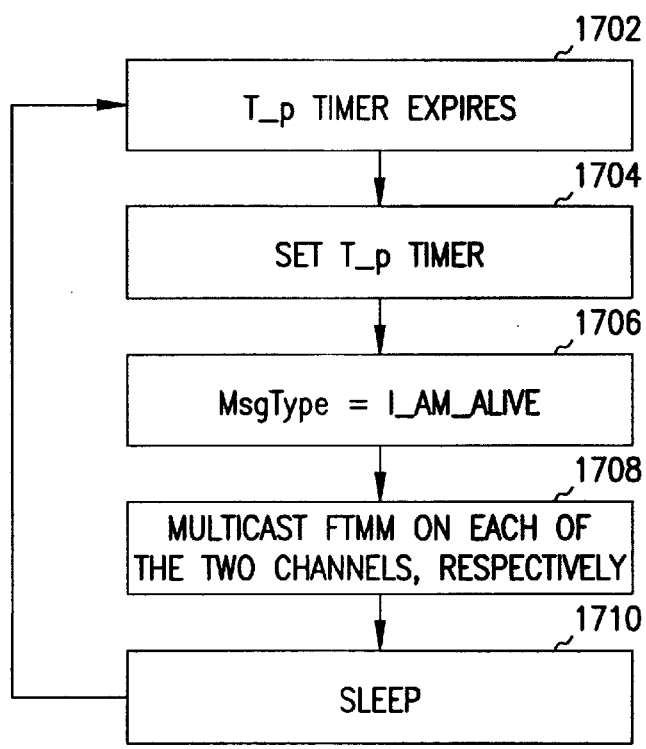
FIG. 17 is a flowchart of one embodiment of the message pair sending operation.

FIG. 17 depicts a flowchart of one embodiment of the message pair sending operation. The process begins with the expiration of the $T_p$ timer at 1702. Upon expiration of the timer, the timer is reset at 1704. An I_AM_ALIVE message is generated at 1706 and multicast as a fault-tolerance manager message on each channel at 1708. The node then sleeps at 1710, waiting for the $T_p$ timer to expire again and repeat the process at 1702.

Figure 18:
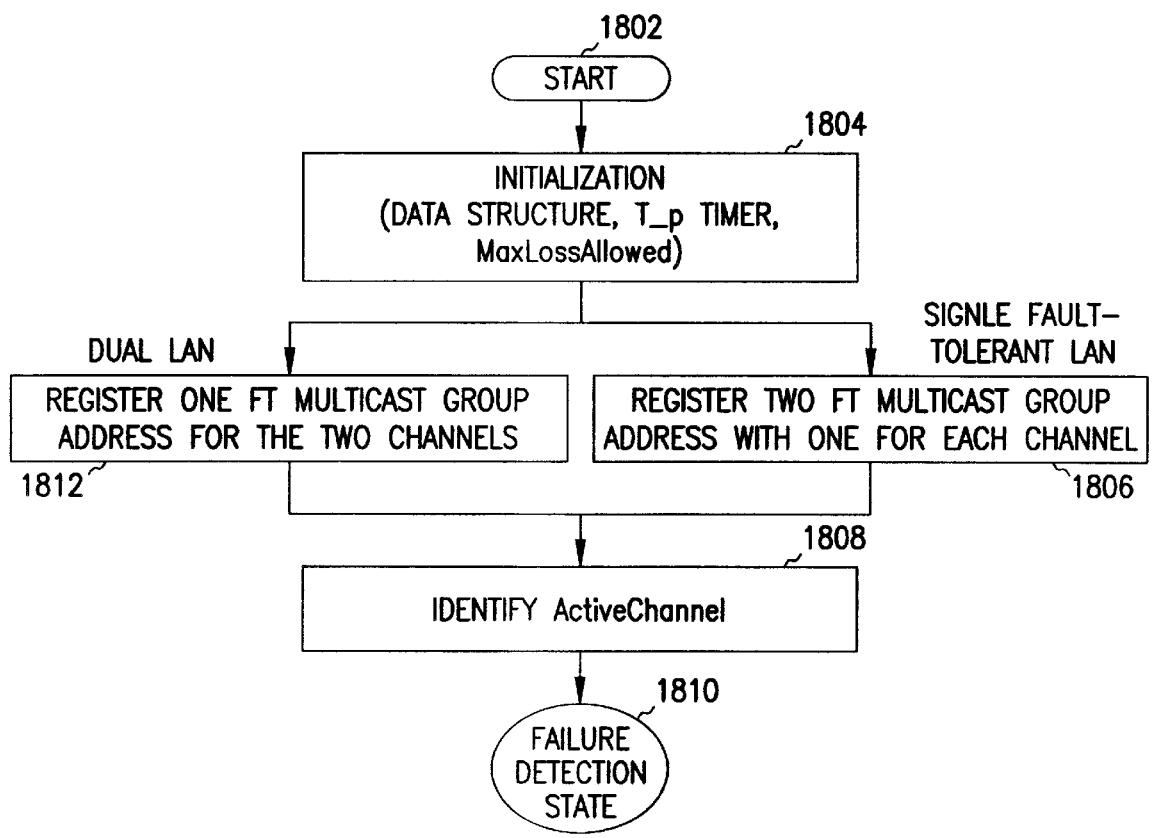
FIG. 18 is a flowchart of a node start-up routine.

FIG. 18 depicts a flowchart of a node start-up routine. The process begins at 1802. The data structure, Tp timer and MaxLoss are initialized at 1804. For the case of a single fault-tolerant network, one fault-tolerance multicast group address is registered for each connected channel at 1806. For the case of a multiple-network system, a single fault-tolerance multicast group address is registered for all connected channels. For either case, the active channel is identified at 1808 and the node enters a failure detection state at 1810.

Figure 19:
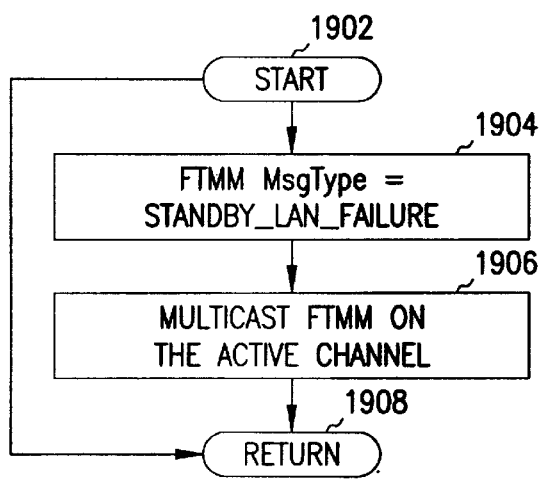
FIG. 19 is a flowchart of routine for reporting a stand-by failure.

FIG. 19 depicts a flowchart of the IndicateStandbyFailuer() routine. The process begins at 1902. A fault-tolerance manager STANDBY_LAN_FAILURE message is generated at 1904 in response to a detection of a failure of a stand-by channel. Failure detection on a stand-by channel mirrors the process described for failure detection on the active channel. The STANDBY_LAN_FAILURE message is then multicast on the active channel at 1906 to indicate to the fault-tolerance managers of each node that the stand-by channel is unavailable for failure recovery of the active channel. The process is repeated at 1908.

CONCLUSION

An approach to implementation of fault-tolerant networks is disclosed. The approach provides a network fault-tolerance manager for detecting network failures and manipulating a node to communicate with an active channel. The approach is particularly suited to Ethernet LANs.

In one embodiment, the network fault-tolerance manager monitors network status by utilizing message pairs, link integrity pulses or a combination of the two failure detection modes. Choice of failure detection mode is configurable in a further embodiment. The network fault-tolerance manager is implemented as middleware, thus enabling use of COTS devices, implementation on existing network structures and use of conventional transport/network protocols such as TCP/IP and others. A network fault-tolerance manager resides with each node and communicates with other network fault-tolerance managers of other nodes.

In one embodiment, the network fault-tolerance manager switches communication of every network node from the channel experiencing failure to a stand-by channel. In another embodiment, the network fault-tolerance manager switches communication of the node detecting a failure from the failed channel to a stand-by channel.

While the invention was described in connection with various embodiments, it was not the intent to limit the invention to one such embodiment. Many other embodiments will be apparent to those of skill in the art upon reviewing the above description.

What is claimed is:

1. A fault-tolerant communication network, comprising:
   at least two nodes, wherein each of the at least two nodes is connected to a plurality of channels for data transmission; and
   a network fault-tolerance manager associated with each of the at least two nodes, wherein the network fault-tolerance manager associated with a node directs that node to selectively transmit data packets on one of the plurality of channels connected to that node, further wherein the network fault-tolerance managers reside in a logical hierarchy above a physical layer of the network and below a transport layer of the network, still further wherein each network fault-tolerance manager communicates with other network fault-tolerance managers;

wherein the plurality of channels utilize network resources, further wherein the network resources utilized for a first channel of the plurality of channels is shared with the network resources utilized by a second channel of the plurality of channels.

2. A fault-tolerant network for data communication, comprising:

a first network;

a second network; and at least two nodes, wherein each of the at least two nodes is connected to the first network and the second network, further wherein each of the at least two nodes has a network fault-tolerance manager, still further wherein each of the network fault-tolerance managers is in communication with other network fault-tolerance managers;

wherein each network fault-tolerance manager directs its corresponding node to selectively transmit data packets on a network selected from the group consisting of the first network and the second network, further wherein each network fault-tolerance manager is responsive to messages received from other network fault-tolerance managers, still further wherein each network fault-tolerance manager resides in a logical hierarchy above a physical layer of the network and below a transport layer of the network;

wherein the first network and the second network are both logical networks of a single physical network.

3. A failure recovery method for a fault-tolerant communication network having an active network and a stand-by network and further having a plurality of nodes connected to the active and stand-by networks, the method comprising:

initiating data communications from a first node, wherein the data communications are transmitted by the first node on the active network through a first network interface;

detecting a failure by the first node, wherein the failure is selected from the group consisting of a failure on the active network and a failure on the stand-by network;

directing the first node to switch data traffic to the stand-by network through a second network interface when the failure is on the active network; and reporting the failure when the failure is on the stand-by network;

wherein the active network and the stand-by network are both logical networks of a single physical network.

4. A machine-readable medium having instructions stored thereon for causing a processor to implement a failure recovery method for a fault-tolerant communication network having an active network and a stand-by network and further having a plurality of nodes connected to the active and stand-by networks, the method comprising:

initiating data communications from a first node, wherein the data communications are transmitted by the first node on the active network through a first network interface;

detecting a failure by the first node, wherein the failure is selected from the group consisting of a failure on the active network and a failure on the stand-by network;

directing the first node to switch data traffic to the stand-by network through a second network interface when the failure is on the active network; and reporting the failure when the failure is on the stand-by network;

wherein the active network and the stand-by network are both logical networks of a single physical network.

5. A failure recovery method for a fault-tolerant communication network having an active network and a stand-by network and further having a plurality of nodes connected to the active and stand-by networks, the method comprising:

initiating data communications from a first node, wherein the data communications are transmitted by the first node on the active network through a first network interface;

detecting a failure by the first node, wherein the failure occurs on the active network;

directing the first node to switch data traffic to the stand-by network through a second network interface; and directing each remaining node of the plurality of nodes to switch data traffic to the stand-by network;

wherein the active network and the stand-by network are both logical networks of a single physical network.

6. A machine-readable medium having instructions stored thereon for causing a processor to implement a failure recovery method for a fault-tolerant communication network having an active network and a stand-by network and further having a plurality of nodes connected to the active and stand-by networks, the method comprising:

initiating data communications from a first node, wherein the data communications are transmitted by the first node on the active network through a first network interface;

detecting a failure by the first node, wherein the failure occurs on the active network;

directing the first node to switch data traffic to the stand-by network through a second network interface; and directing each remaining node of the plurality of nodes to switch data traffic to the stand-by network.

7. A failure detection method for a fault-tolerant communication network having an active network and a stand-by network and further having a plurality of nodes connected to the active and stand-by networks, the method comprising:

transmitting a plurality of message pairs from a first node, wherein a first message of each message pair is transmitted on the active network and a second message of each message pair is transmitted on the stand-by network;

monitoring receipt of the plurality of message pairs at a second node, wherein monitoring receipt comprises determining an absolute delta time between receiving the first and second messages of each message pair;

comparing the absolute delta time of each message pair to a predetermined time, wherein an absolute delta time greater than the predetermined time is indicative of a receipt failure; and declaring a failure if a number of consecutive receipt failures exceeds a predetermined maximum;

wherein the failure is selected from the group consisting of a failure on the active network and a failure on the stand-by network.

8. A failure detection method for a fault-tolerant communication network having an active network and a stand-by network and further having a plurality of nodes connected to the active and stand-by networks, the method comprising:

transmitting a plurality of message pairs from a first node, wherein a first message of each message pair is transmitted on the active network and a second message of each message pair is transmitted on the stand-by network;

monitoring receipt of the plurality of message pairs at a second node, wherein monitoring receipt comprises determining an absolute delta time between receiving the first and second messages of each message pair;

comparing the absolute delta time of each message pair to a predetermined time, wherein an absolute delta time greater than the predetermined time is indicative of a receipt failure; and declaring a failure if a number of consecutive receipt failures exceeds a predetermined maximum;

wherein the active network and the stand-by network are both logical networks of a single physical network.

9. A failure detection method for a fault-tolerant communication network having an active network and a stand-by network and further having a plurality of nodes connected to the active and stand-by networks, the method comprising:

transmitting a plurality of message pairs from a first node, wherein a first message of each message pair is transmitted on the active network and a second message of each message pair is transmitted on the stand-by network;

monitoring receipt of the plurality of message pairs at a second node, wherein monitoring receipt comprises determining an absolute delta time between receiving the first and second messages of each message pair;

comparing the absolute delta time of each message pair to a predetermined time, wherein an absolute delta time greater than the predetermined time is indicative of a receipt failure; and declaring a failure if a number of consecutive receipt failures exceeds a predetermined maximum;

wherein receiving the first message of a message pair occurs before receiving the second message of the message pair.

10. A failure detection method for a fault-tolerant communication network having an active network and a stand-by network and further having a plurality of nodes connected to the active and stand-by networks, the method comprising:

transmitting a plurality of message pairs from a first node, wherein a first message of each message pair is transmitted on the active network and a second message of each message pair is transmitted on the stand-by network;

monitoring receipt of the plurality of message pairs at a second node, wherein monitoring receipt comprises determining an absolute delta time between receiving the first and second messages of each message pair;

comparing the absolute delta time of each message pair to a predetermined time, wherein an absolute delta time greater than the predetermined time is indicative of a receipt failure; and declaring a failure if a number of consecutive receipt failures exceeds a predetermined maximum;

wherein transmitting a plurality of message pairs comprises transmitting a plurality of message pairs at regular intervals.

11. A failure detection method for a fault-tolerant communication network having an active network and a stand-by network and further having a plurality of nodes connected to the active and stand-by networks, the method comprising:

transmitting a plurality of message pairs from a first node, wherein a first message of each message pair is transmitted on the active network and a second message of each message pair is transmitted on the stand-by network;

monitoring receipt of the plurality of message pairs at a second node, wherein monitoring receipt comprises determining an absolute delta time between receiving the first and second messages of each message pair;

comparing the absolute delta time of each message pair to a predetermined time, wherein an absolute delta time greater than the predetermined time is indicative of a receipt failure; and declaring a failure if a number of consecutive receipt failures exceeds a predetermined maximum;

wherein declaring a failure if a number of consecutive receipt failures exceeds a predetermined maximum comprises declaring a failure if a number of consecutive receipt failures exceeds one.

12. A machine-readable medium having instructions stored thereon for causing a processor to implement a failure detection method for a fault-tolerant communication network having an active network and a stand-by network and further having a plurality of nodes connected to the active and stand-by networks, the method comprising:

transmitting a plurality of message pairs from a first node, wherein a first message of each message pair is transmitted on the active network and a second message of each message pair is transmitted on the stand-by network;

monitoring receipt of the plurality of message pairs at a second node, wherein monitoring receipt comprises determining an absolute delta time between receiving the first and second messages of each message pair;

comparing the absolute delta time of each message pair to a predetermined time, wherein an absolute delta time greater than the predetermined time is indicative of a receipt failure; and declaring a failure if a number of consecutive receipt failures exceeds a predetermined maximum.

13. A failure detection method for a fault-tolerant communication network having an active network and a stand-by network and further having a plurality of nodes connected to the active and stand-by networks, the method comprising:

transmitting a first message of a message pair from a first node on the active network;

transmitting a second message of the message pair from the first node on the stand-by network;

receiving the first message by a second node on the active network;

waiting a predetermined time to receive the second message at the second node on the stand-by network; and declaring a failure if the second message does not arrive at the second node on the stand-by network within the predetermined time;

wherein transmitting a first message occurs before transmitting a second message.

14. A machine-readable medium having instructions stored thereon for causing a processor to implement a failure detection method for a fault-tolerant communication network having an active network and a stand-by network and further having a plurality of nodes connected to the active and stand-by networks, the method comprising:

transmitting a first message of a message pair from a first node on the active network;

transmitting a second message of the message pair from the first node on the stand-by network;

receiving the first message by a second node on the active network;

waiting a predetermined time to receive the second message at the second node on the stand-by network; and declaring a failure if the second message does not arrive at the second node on the stand-by network within the predetermined time.

15. A failure detection method for a fault-tolerant communication network having an active network and a stand-by network and further having a plurality of nodes connected to the active and stand-by networks, the method comprising:

transmitting a first message of a message pair from a first node on the active network;

transmitting a second message of the message pair from the first node on the stand-by network;

receiving a message by a second node, wherein the message is selected from the group consisting of the first message and the second message;

waiting a predetermined time to receive a remaining message of the message pair by the second node; and declaring a failure if the remaining message does not arrive at the second node within the predetermined time;

wherein transmitting a first message occurs before transmitting a second message.

16. A machine-readable medium having instructions stored thereon for causing a processor to implement a failure detection method for a fault-tolerant communication network having an active network and a stand-by network and further having a plurality of nodes connected to the active and stand-by networks, the method comprising:

transmitting a first message of a message pair from a first node on the active network;

transmitting a second message of the message pair from the first node on the stand-by network;

receiving a message by a second node, wherein the message is selected from the group consisting of the first message and the second message;

waiting a predetermined time to receive a remaining message of the message pair by the second node; and declaring a failure if the remaining message does not arrive at the second node within the predetermined time.

17. A failure detection method for a fault-tolerant communication network having an active network and a stand-by network and further having a plurality of nodes connected to the active and stand-by networks, the method comprising:

transmitting a first message of a first message pair from a first node on the active network;

transmitting a second message of the first message pair from the first node on the stand-by network;

receiving a message by a second node, wherein the message is selected from the group consisting of the first message of the first message pair and the second message of the first message pair;

waiting a first predetermined time to receive a remaining message of the first message pair by the second node;

transmitting a first message of a second message pair from the first node on the active network;

transmitting a second message of the second message pair from the first node on the stand-by network;

receiving a message by a second node, wherein the message is selected from the group consisting of the first message of the second message pair and the second message of the second message pair;

waiting a second predetermined time to receive a remaining message of the second message pair by the second node; and declaring a failure if the remaining message of the first message pair does not arrive at the second node within the first predetermined time and the remaining message of the second message pair does not arrive at the second node within the second predetermined time, wherein the remaining message of the first message pair and the remaining message of the second message pair were both transmitted on one network selected from the group consisting of the active network and the stand-by network.

18. A machine-readable medium having instructions stored thereon for causing a processor to implement the method of claim 17.

* * * * *